March 12, 1963 R. A. BURGY ETAL 3,080,944
ELEVATOR CONTROLS
Filed July 6, 1960 12 Sheets-Sheet 8
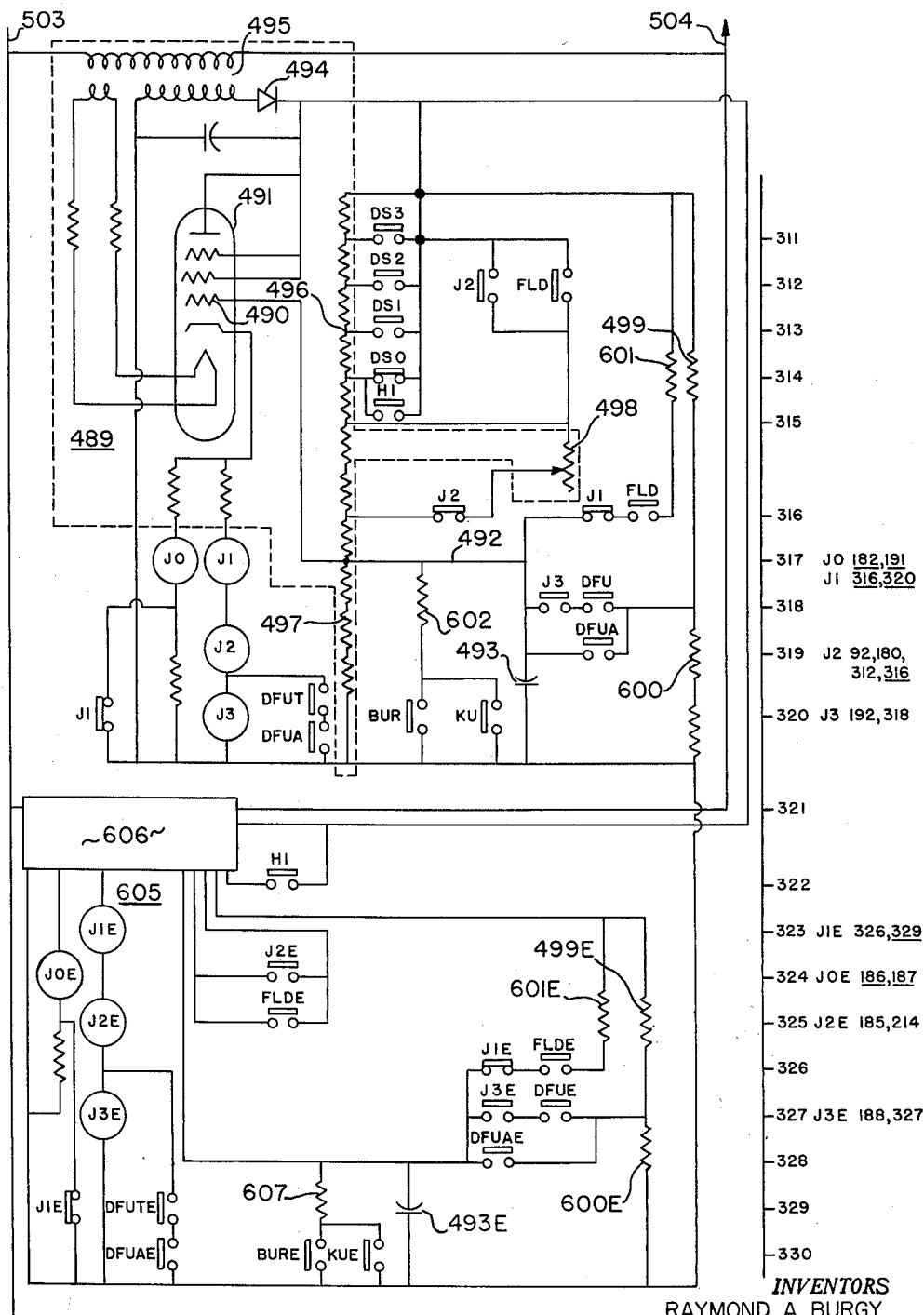
Fig. IX
INVENTORS
RAYMOND A. BURGY
PAUL F. DeLAMATER
BY ERNEST B. THURSTON
Marshall + Wilson
ATTORNEYS

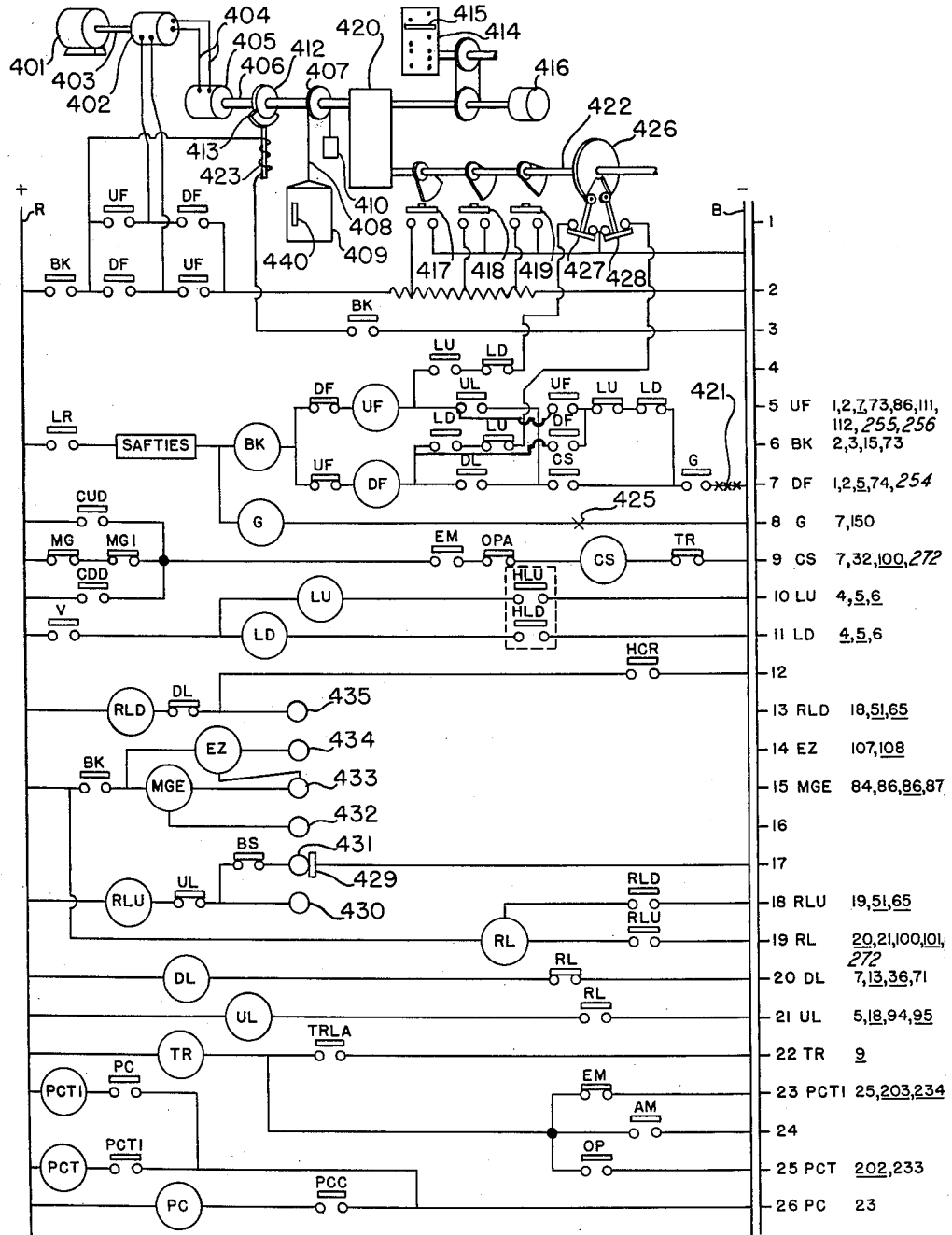

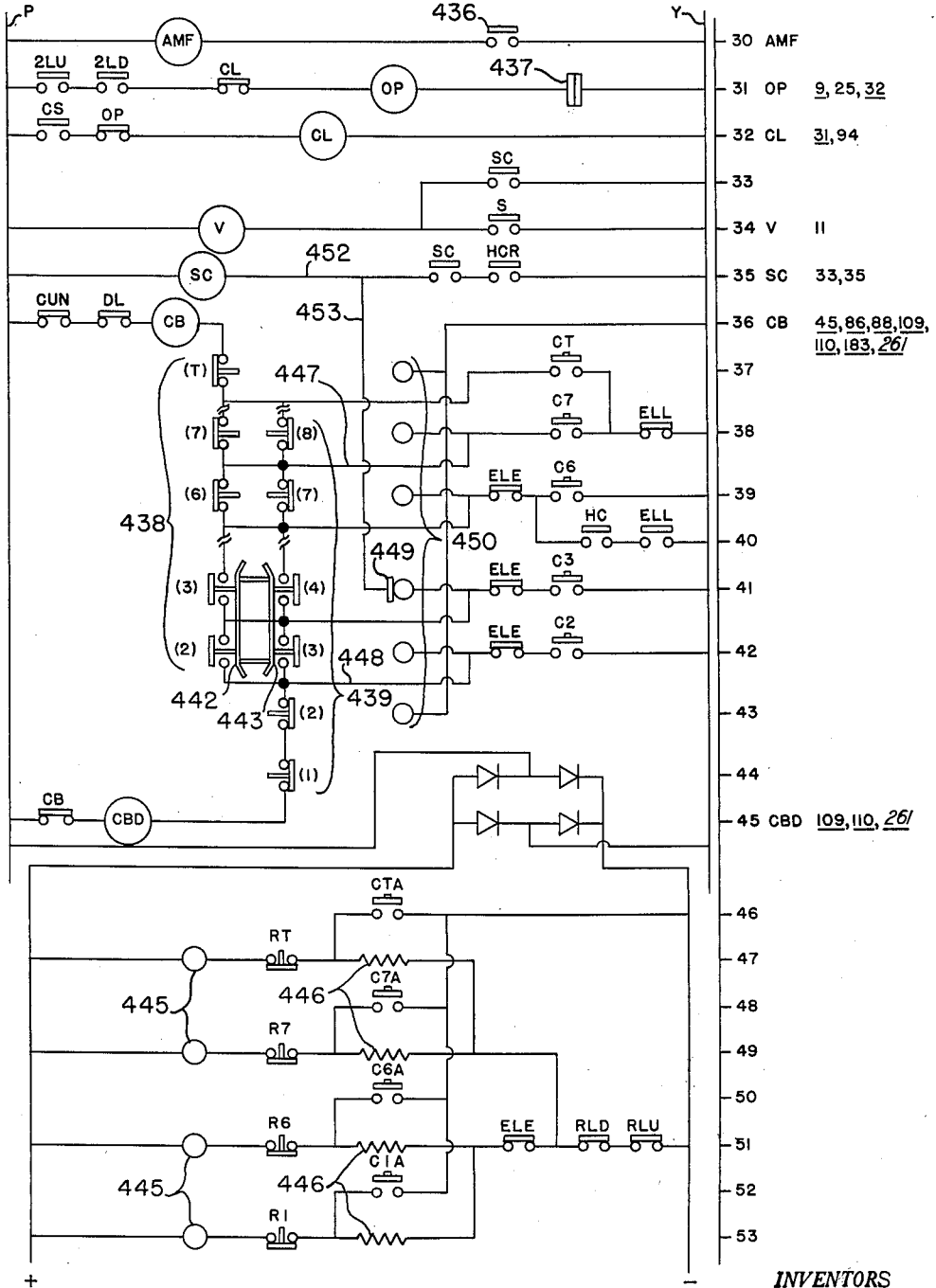

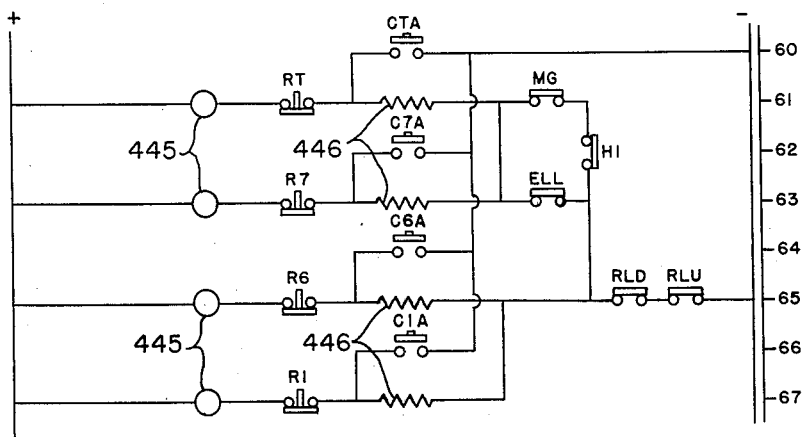
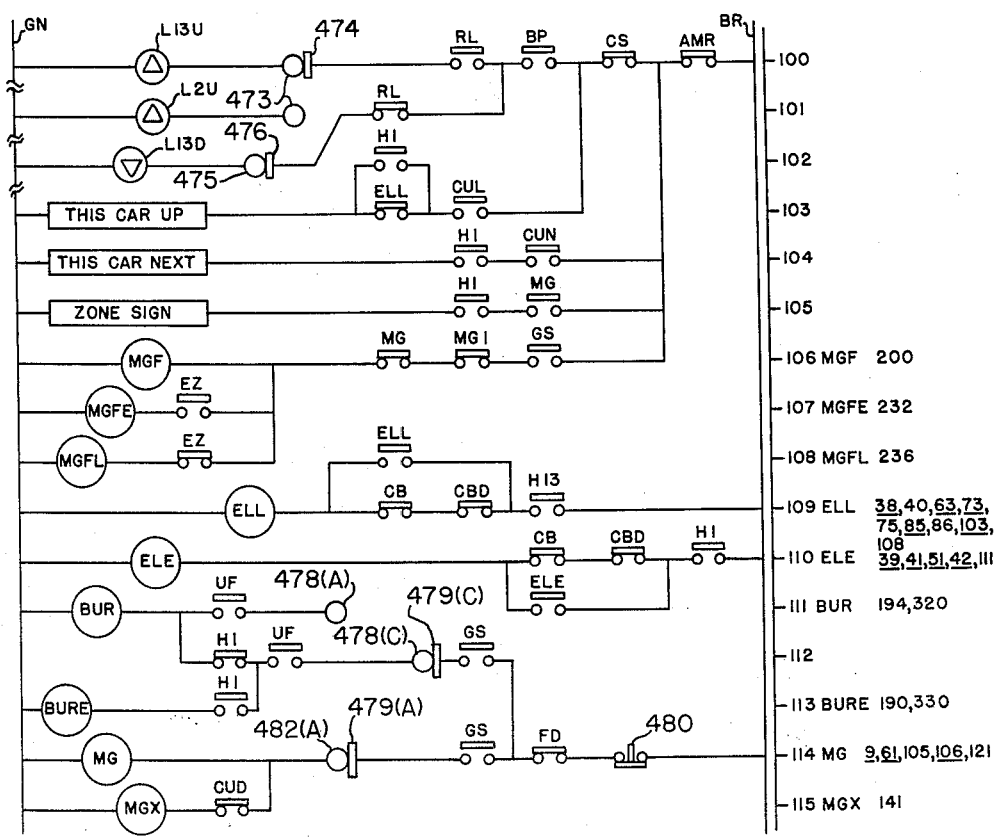

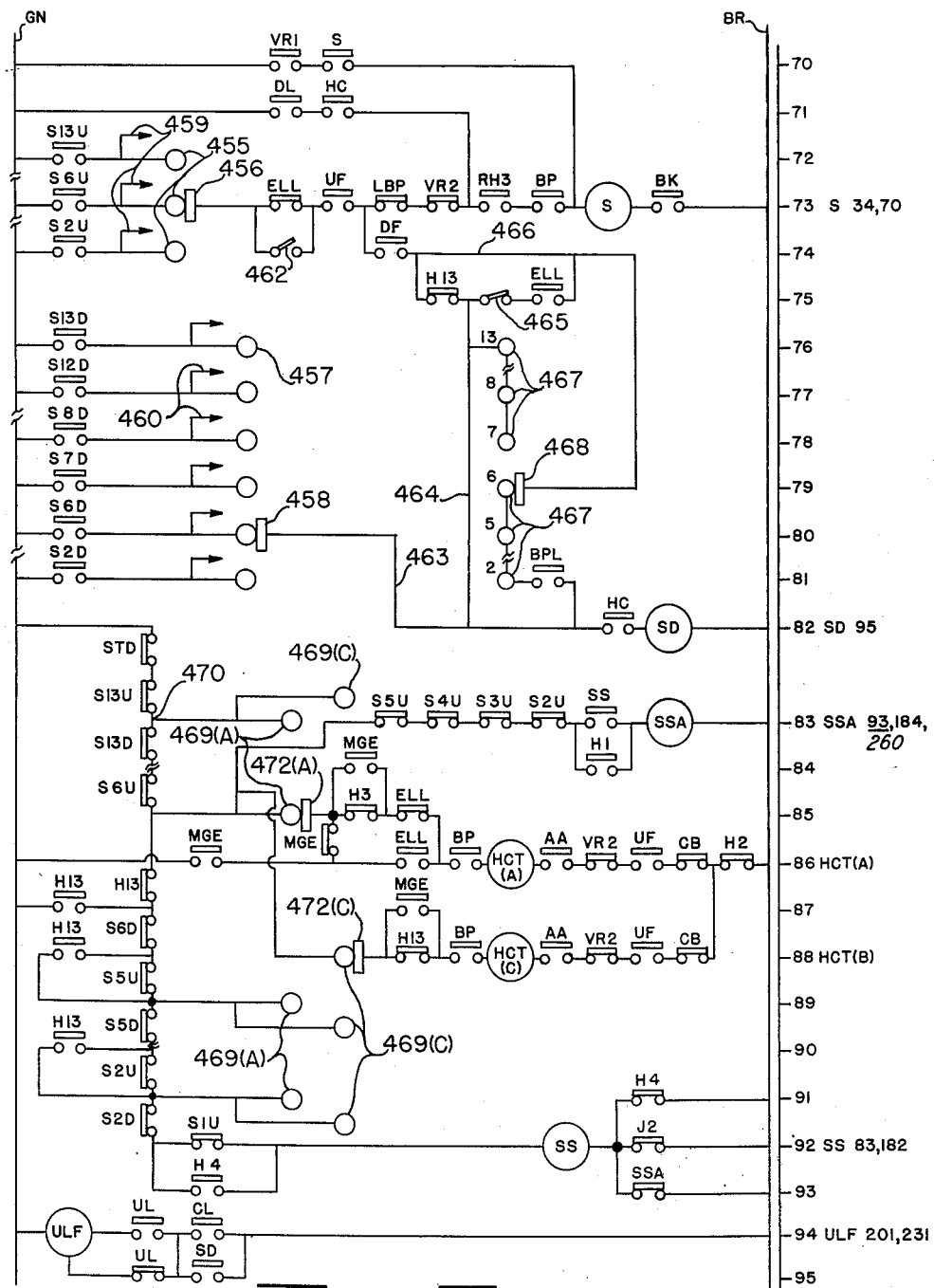
Fig. IV

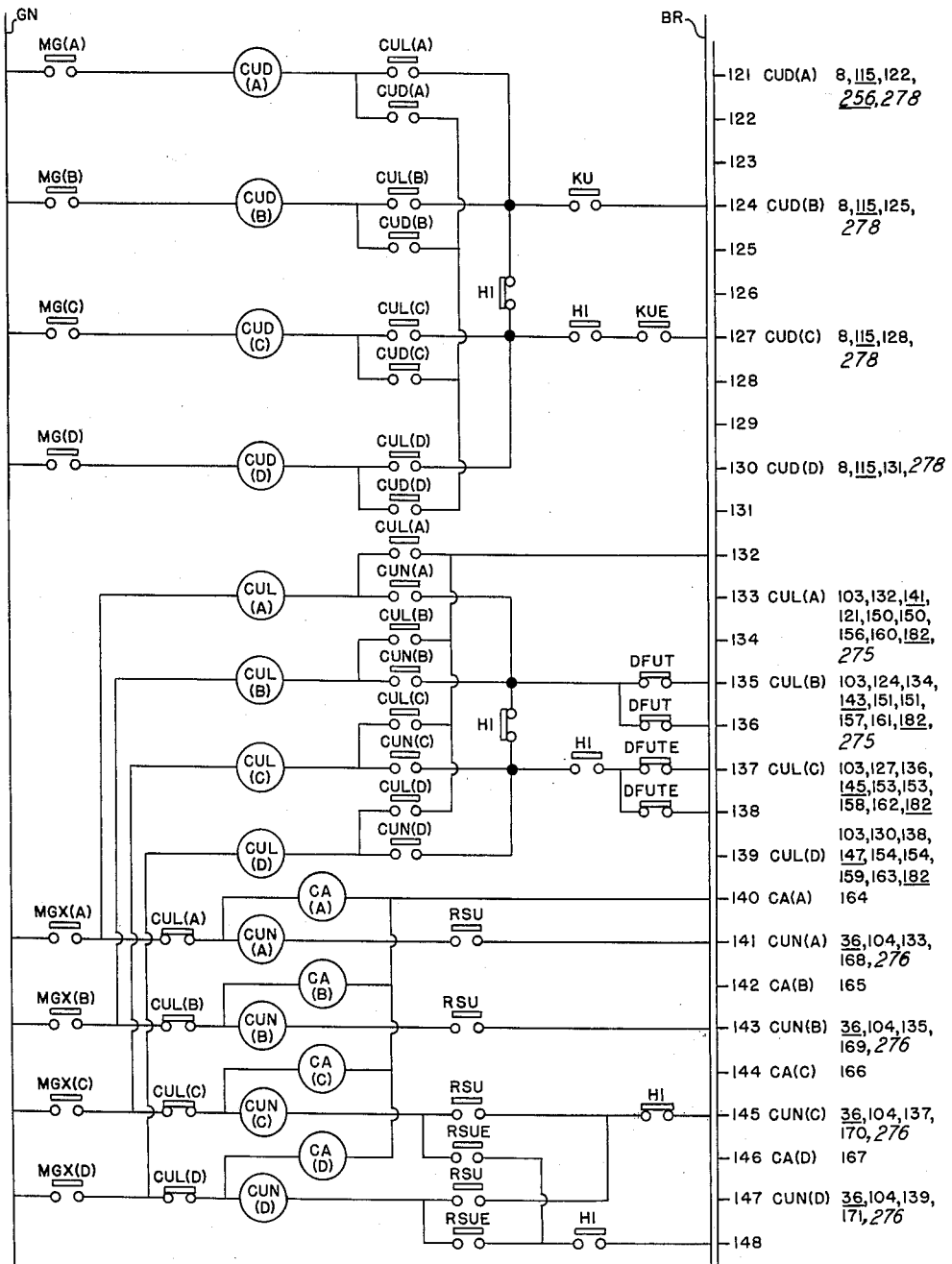
Fig. VI

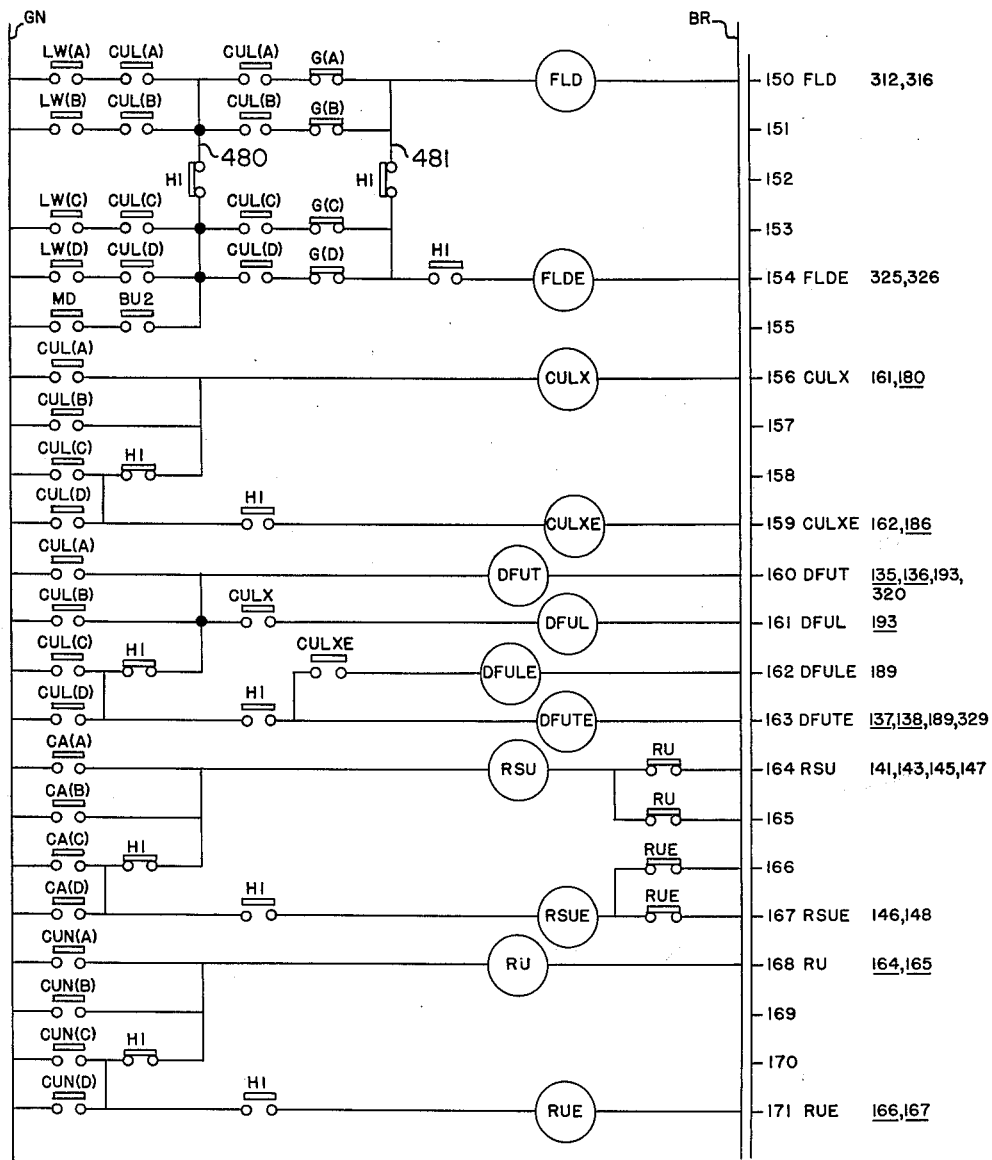
Fig. VII

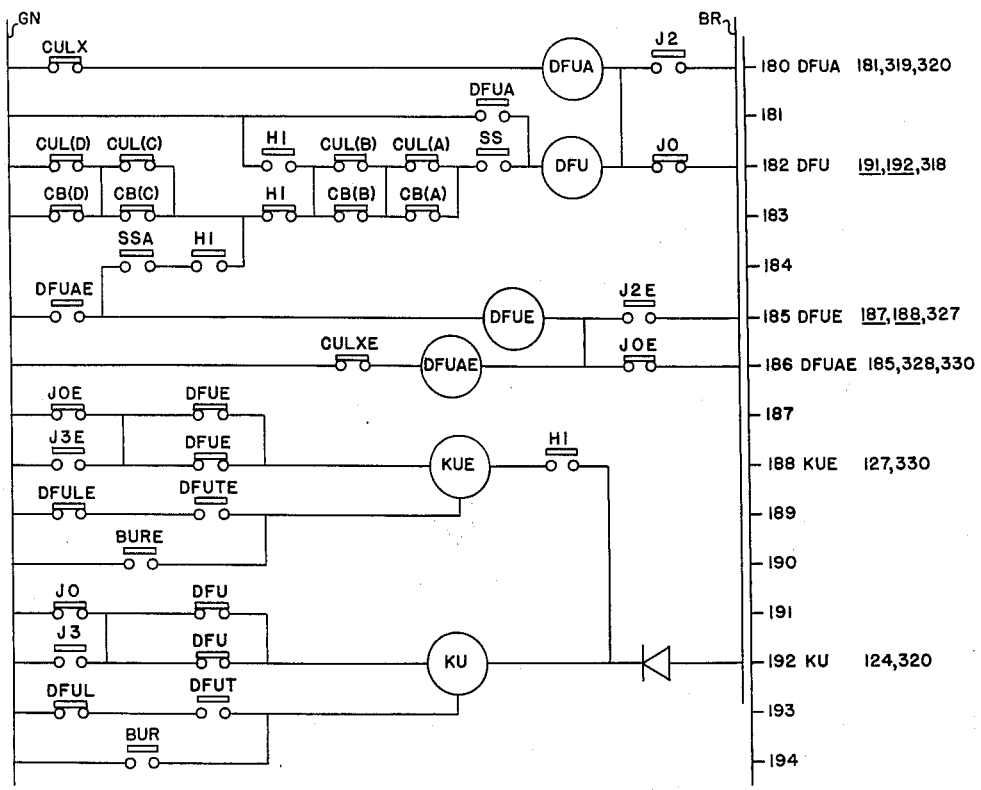
Fig. VIII

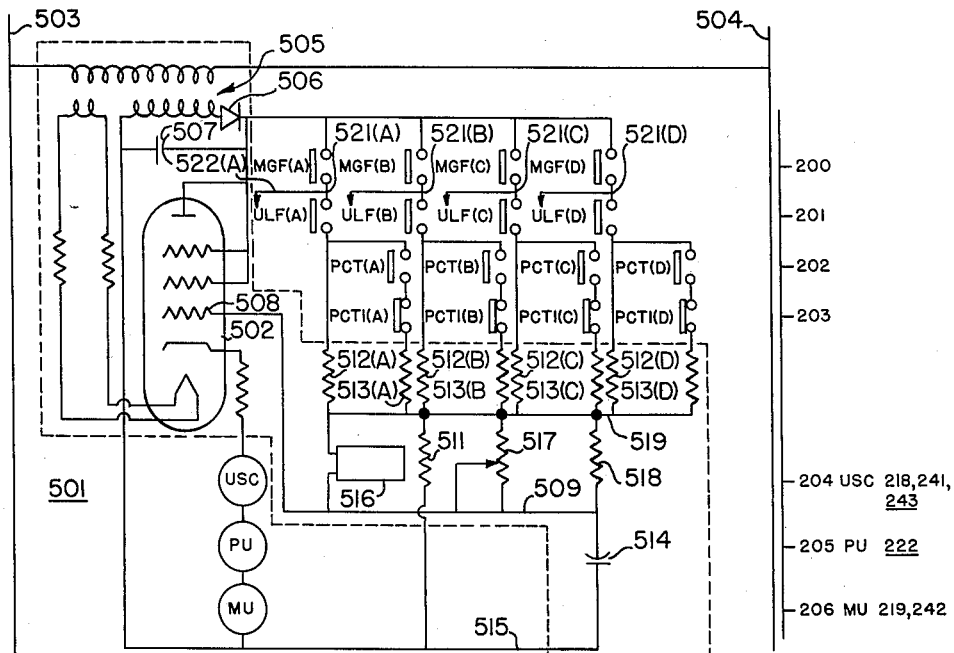
Fig-X
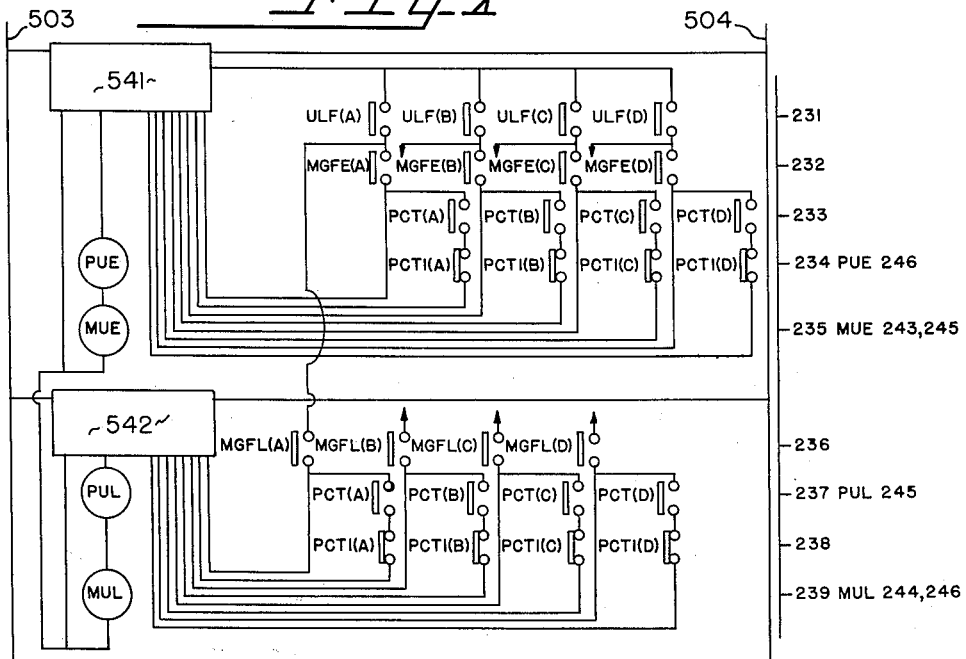
Fig-XII

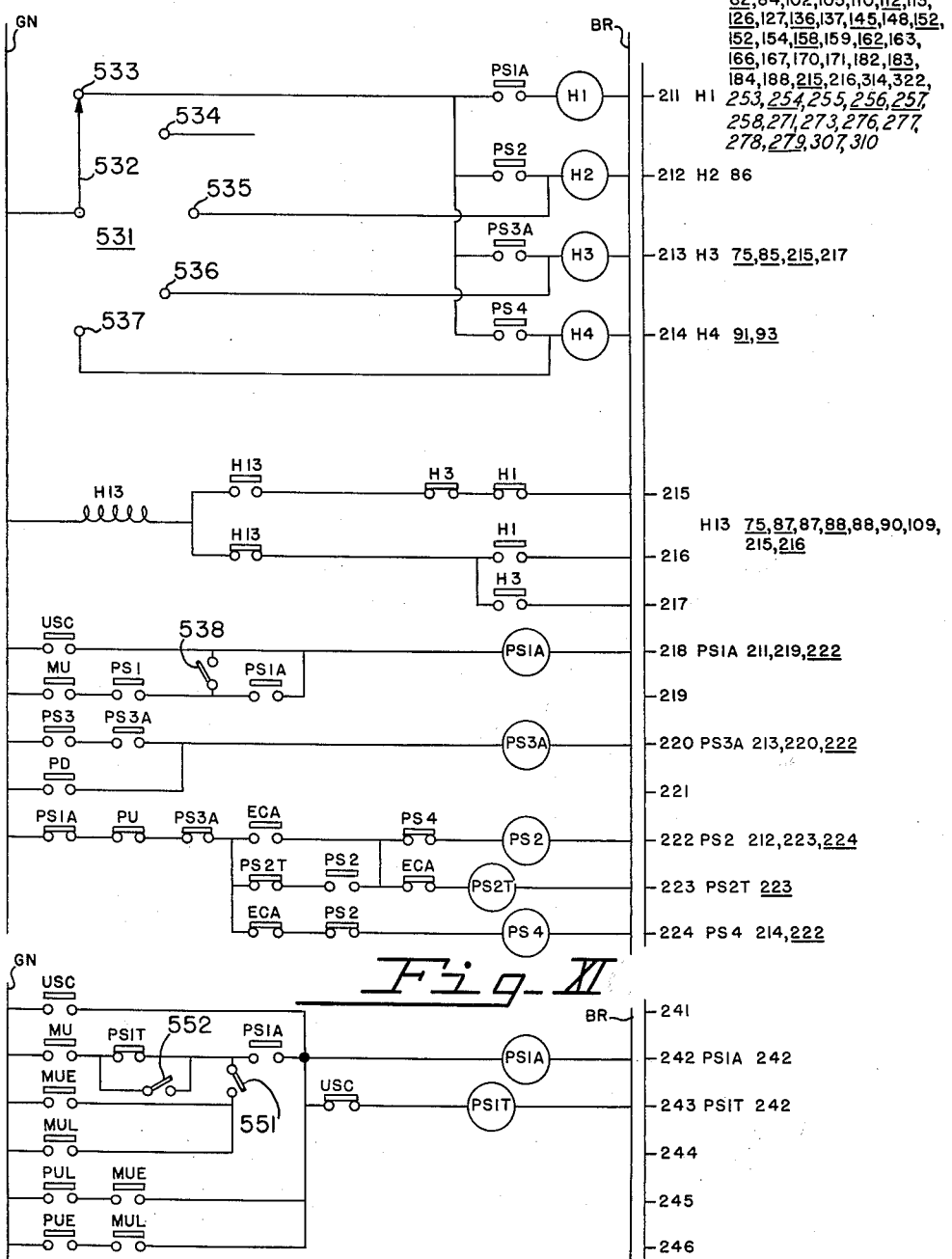

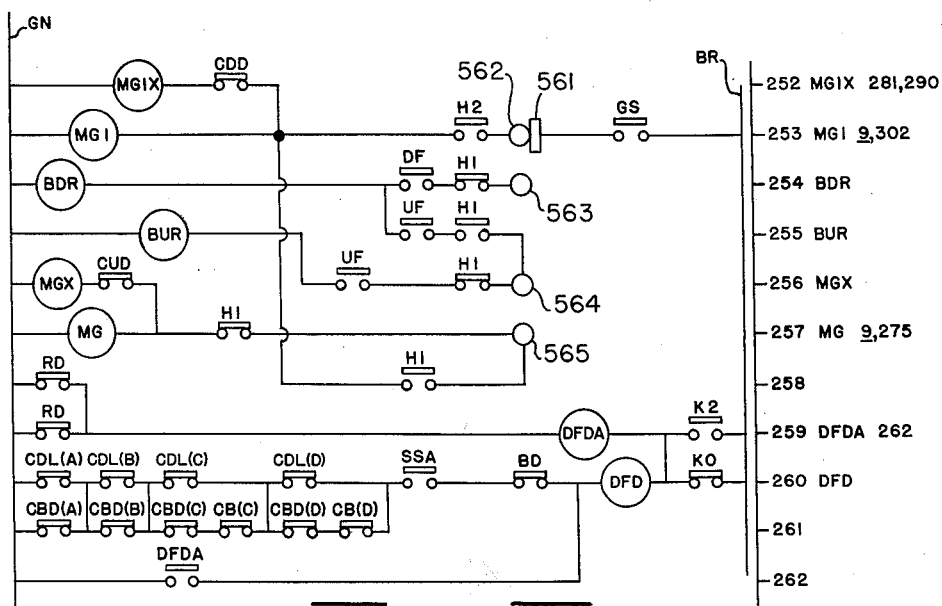
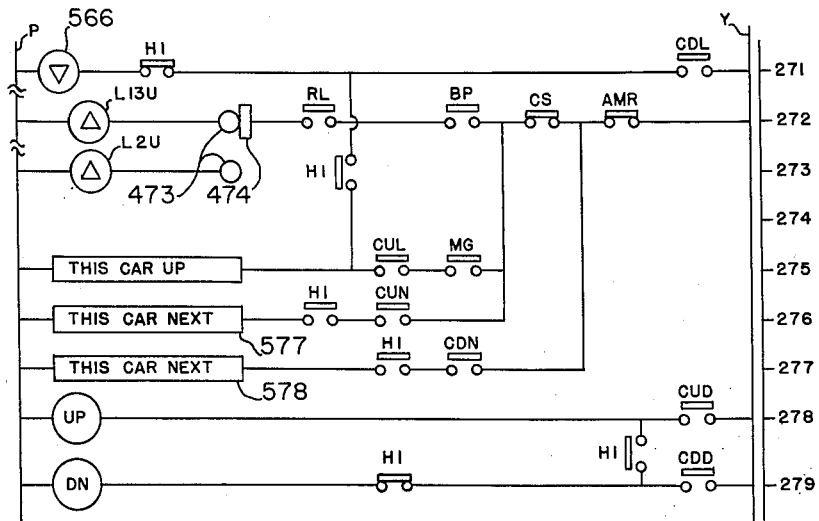

March 12, 1963 R. A. BURGY ETAL 3,080,944
ELEVATOR CONTROLS
Filed July 6, 1960 12 Sheets-Sheet 12
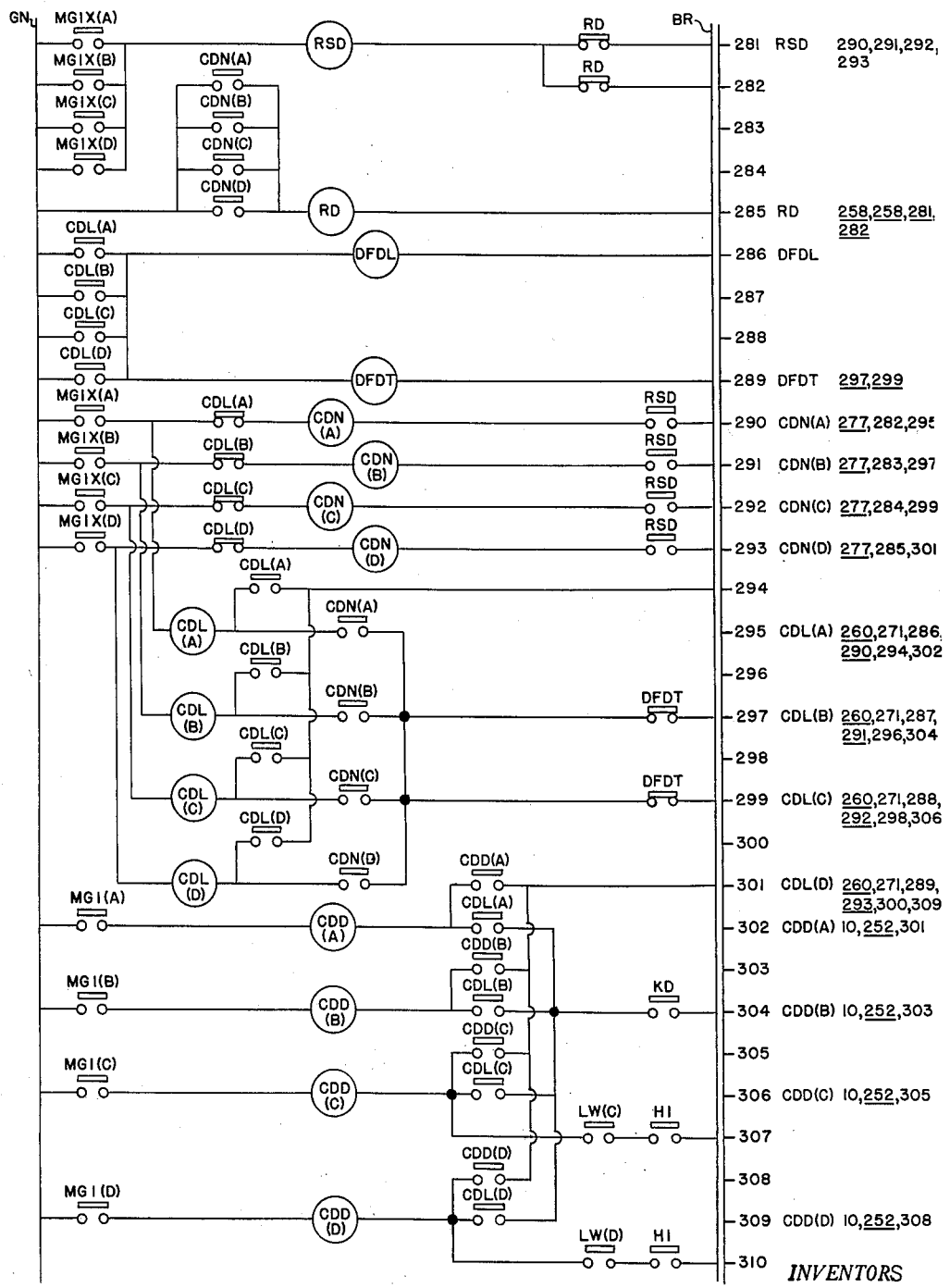
Fig. XVI
INVENTORS
RAYMOND A. BURGY
PAUL F. DeLAMATER
ERNEST B. THURSTON
BY
Marshall & Wilson
ATTORNEYS 了
United States Patent Office 3,080,944
Patented Mar. 12, 1963

3,080,944
ELEVATOR CONTROLS
Raymond A. Burgy, Maumee, and Paul F. De Lamater and Ernest B. Thurston, Toledo, Ohio, assignors to Toledo Scale Corporation, Toledo, Ohio, a corporation of Ohio
Filed July 6, 1960, Ser. No. 41,087
42 Claims. (Cl. 187—29).

This invention relates to controls for a group of elevators and more particularly to a novel combination of operating features and means to establish such features to improve the service afforded by a group of elevators.

Variations in the traffic imposed upon an elevator system which are best met by changing the operating mode of the system long have been recognized. In order to meet these variations four basic modes of operation have been evolved and a number of intermediate modes of operation have been provided in an effort to meet gradations in traffic level and character. Elevators are arranged to provide off hours service wherein only a limited portion of cars in the group are conditioned to respond to service demands. Thus, in the night when the structure served is virtually depopulated and only the maintenance personnel in the building require elevator service, a number of cars in a bank may be shut down leaving only one or two cars to provide the service necessary for building maintenance and the occasional traffic which might also be imposed. A surge of traffic requiring travel from the lower floors of the building to the upper floors occurs in the morning at the beginning of the working day and at the end of the noon period. This type of traffic imposes a requirement on the system best met by a mode of operation generally referred to as up peak service. During the working day moderate demands for travel in both directions are imposed at a level sufficient to warrant the maintenance of a substantial number of cars, frequently all available in the bank, in operation. Such operation is known as the off peak or balanced mode or program. At the beginning of the lunch hour and at the end of the working day the building must be rapidly depopulated and a substantial surge of traffic seeking travel to the building exits from virtually all the floors of the building is encountered. The mode of operation utilized to meet this type of traffic is identified as the down peak.

Down peak operation has been provided by controls for restricting the region in which certain cars of the system can give service. Most frequently these controls separate the landings into an upper and a lower zone and assign selected cars to serve the descending traffic in those zones by being dispatched virtually immediately upon their arrival and completion of their unloading at the lower landing. Service for ascending traffic is reduced while that for descending traffic is enhanced. Usually the low zone cars are limited in their ascent to the upper limit of the low zone and reverse at the highest call in that zone. Low zone cars also are frequently prevented from serving car calls, particularly where those calls are registered while the car is standing at the lower terminal, and also are prevented from serving up landing calls. The high zone cars high call reverse in the upper zone of landings and can be limited to respond to down landing calls at that upper zone of landings, to car calls for all landings, and to up landing calls for all landings.

The present invention is concerned primarily with improving the service during the up peak service condition. In a typical up peak condition passengers enter the elevator cars at a common floor such as the lower terminal or ground floor, or, in buildings with parking garages situated in the basement or entries from public transportation at other levels, from a ground floor and a limited number of other floors closely adjacent the ground floor to travel to most or all of the floors in the building other than those from which the load is acquired. This condition has resulted in extremely inefficient traffic flow. For example, the cars are frequently loaded to capacity under these conditions and, as in the case of a car having a capacity of fifteen passengers, the first passenger to enter may desire to leave the car at the lowest of the several floors the car is required to serve. This results in the travel of the car away from the lower terminal being impeded by the necessity for partially unloading the car at the first stop to permit the passenger desiring to exit at that landing to leave the car, thereafter reloading the car and sending it again in an ascending direction to serve the remaining calls. This type of service may be repeated at several of the lower floors with substantial aggravation to those passengers requiring travel to the upper floors of the building. Further inconvenience to ascending passengers is occasioned by the response of ascending cars to up landing calls during this up peak period. Since this period is encountered in the morning rush hour when the occupants of the building are seeking to get to their working locations it has also been noted that it is highly desirable to maintain cars available at the loading floor so that the passengers may enter those cars even though they do not immediately receive transportation away from the loading floor. This suggests that car travel should be distributed such that within the limits of the system some means should be provided to endeavor to maintain a car available for loading at the floor on which the passengers enter the building.

The present invention has for its object the elimination of the problems set forth above by improving elevator controls. More specific objects of this invention are to distribute elevator service equally in accordance with the traffic requirements over the building, to confine the service of individual elevators to limited regions within the building such that their trips more effectively transport passengers by conveying more passengers per stop, to eliminate unnecessary stops of elevator cars and thereby expedite their service, and to facilitate the direction of passengers into the cars best capable of their requirements.

These objects are realized by assigning cars to serve zones of floors during the imposition of ascending traffic conditions which exceed those adequately met by the usual up peak operation. Such assignment can be effected automatically by a sensing of the traffic conditions in the system. When so zoned, the loading of the cars can be controlled more effectively by providing separate dispatching systems for the several groups of elevators into which the primary elevator group is divided, whereby cars are held at the lower terminal for an interval while indicating means are actuated to guide the prospective passengers into the car which is assigned to leave the floor next in the dispatching sequence. Thus in a system broken down into two zones, one a group of upper or high rise landings, the other a group of lower or low rise landings, a high rise or upper zone and low rise or lower zone dispatcher system is provided for controlling the departure of the cars from the floor at which they are loaded.

While interfloor traffic, particularly ascending traffic, during an up peak operation is of a rather low intensity, the occasional registration of a landing call for travel upward retards the service afforded to a substantial degree. Accordingly, the service provided for up landing calls during zoned up peak operation is curtailed as by preventing the cars serving one of the zones, preferably the low zone, from responding to such calls. Thus the low zone cars can be arranged advantageously to answer only down landing calls and car calls in the low zone or they can be further expedited in their service by confining their response solely to car calls in their zone. Limited service to the calls which cannot be answered by the low zone cars can be provided by the high zone cars which answer all up landing calls, down landing calls in the upper zone, and car calls in the upper zone. Service is improved by providing the cars with a by passing control which prevents response to landing calls when the car's load is greater than a given amount such as 80% of rated capacity. Since up service zoning is instituted only in response to a saturated service condition ascending cars frequently load by pass up landing calls. Again, in order to avoid an overlap of service where the low zone cars are arranged to answer down landing calls in the low zone the high zone cars can be arranged to exclude such calls.

Additional features facilitating operation of elevator cars where saturated up peak traffic condition exists include the provision of high call reversal means which reverse the cars and initiate their travel downward upon the response to the highest down landing call or car call. In the event that basement landings are inaccessible to a substantial number of prospective passengers, basement service can be cut out during this up peak operation. A number of means of instituting service to meet a saturated up traffic state can be employed. In many buildings this condition can be predicted with certainty to occur at a given time of day. Thus if a general influx of occupants occurs between 8:45 and 9 o'clock, the saturated up peak operating program can be established for that period by virtue of a time clock. Loading of the elevator cars at the lower dispatching terminal is also indicative of the traffic level requiring service upward. In the preferred embodiments disclosed herein zoned up peak operation is introduced by sensing the stop time of ascending cars in the system and the number of passengers in those cars. However, alternatives are also contemplated wherein the service to the individual zones represented by the number of passengers traveling to those zones and the stop time of the cars in those zones, might also be employed. Further, various combinations of traffic conditions warrant a zoned up peak operation as where a moderate predominance of traffic is sensed in one zone and a peak of up traffic is sensed in another, where a saturated peak of up traffic is sensed in one or both zones or in the entire system, and where a combination of the time of day and a particular traffic condition of the type outlined above is indicative of a further anticipated development of traffic requirements based upon the traffic patterns experienced in the structure served by the elevator system. The sensing of these conditions can be confined to ascending traffic thereby excluding the effect of descending traffic and, if desired, even interfloor traffic since travel of this type will ordinarily be at a minimum during a saturated up peak condition.

In each of the three embodiments set forth below in detail during the saturated up peak mode of operation the bank of elevators is split into two banks, a first serving a lower group of floors and the second an upper group of floors. The cars are arranged upon the institution of this split form of service to serve predetermined zones. However, it is to be appreciated that the system can be further refined by the utilization of the known automatic zone assigning means such as those which sense the requirements of the traffic conditions for the several zones and assign the cars accordingly, or to means which enable a predetermined assignment to be set up as by manual switches individual to the cars. The cars respond to their zone assignments only when their last car call is canceled, indicating that the current service demand imposed upon them has been satisfied. At the lower dispatching floor each group of cars has an individual dispatching mechanism which in the illustrated embodiment is a dispatch timer and individual systems for assigning the sequence of departure of cars from the floor. The zone of landing served by each car is indicated, as by signs adjacent the car entries. Where two or more cars are available for a service to a particular zone a first of the cars can be designated the load car and another of the cars designated the next to load car. These designations can be indicated by suitable illuminated signs located at the dispatching landing adjacent of the car doors, in the frame of car entry, or in the car. The status of the next to load car also can be indicated by raising its illumination level above that of all other cars but the load car at the floor.

The first embodiment disclosed will include means to split a bank of elevator cars into a lower group or zone of landings and an upper group or zone of landings in response to the traffic conditions in the entire system. It will employ a supplementary dispatch system which arbitrarily has been assigned to serve the bank of cars serving the upper zone while the primary dispatching system serves exclusively the bank of cars serving the lower zone. In the second system set forth, the bank of cars is split as in the first embodiment, into two secondary banks each having a dispatching system in response to a combination of traffic conditions in the several zones. The third embodiment is arranged to reduce the equipment necessary for dispatching by taking advantage of the fact that during up peak operations the dispatching system for the upper dispatching terminal is not ordinarily utilized and by altering the controls for that upper dispatching system so that it will serve as the second lower dispatching system and provide the dispatch controls for the bank of cars serving the upper group of floors.

The above and other objects and features of this invention will be more fully appreciated from the following detailed description when read in conjunction with the accompanying drawings in which:

FIG. I is an across-the-line wiring diagram of the controls for an individual car in a bank of cars as employed with this invention, the circuits being greatly simplified for purposes of illustrating the invention;

FIG. II is an across-the-line diagram of additional circuits individual to the car including the circuits responsive to car calls and those for controlling the registration of car calls; particularly car call registration on a car serving an upper zone of landings during a saturated up peak program;

FIG. III is an across-the-line diagram of portions of a car call registering circuit for a car serving a lower zone of landings during a saturated up peak program;

FIG. IV illustrates the landing call circuits which are common to the cars in a fragmentary across-the-line diagram together with portions of those circuits effective on individual cars serving each of the upper and lower groups of floors;

FIG. V is an across-the-line diagram of the circuit controlling typical indicators for the cars, the circuits for assigning cars to zones, and the circuits for sensing the presence of the cars serving the upper and lower zones at the lower dispatching terminal and for sensing their departure from lower dispatching terminal;

FIG. VI is an across-the-line diagram of the circuits for a bank of four cars which sense the availability of the cars at the lower dispatching terminal and condition those cars for a next and for an up load status, together with the means for separating the controls to serve two secondary banks of cars one serving the lower zone of landings and the other the upper zone of landings under the zoned up peak mode of operation;

FIGS. VII and VIII are across-the-line diagrams of certain of the dispatch controlling circuits for the primary bank of cars and the two secondary banks of cars serving an upper and a lower group of landings during a zoned up peak operation;

FIG. IX shows the circuit diagram for a dispatch timer controlling the entire bank of elevators and means to modify that timer for controlling a portion of the subdivided bank together with a supplemental dispatch timer for the remaining portions of the subdivided bank;

FIG. X is an across-the-line diagram of a circuit which totalizes the stopping time of the elevator cars in the system over the entire travel of the cars and totalizes the passenger count in the cars as the means of sensing the traffic conditions requiring changes in the operating mode of the system;

FIG. XI is an across-the-line diagram of the program selection and programming circuits for effecting the changes in operating mode of the system according to this invention;

FIG. XII is a schematic diagram of the circuits for sensing the stopping interval and the passenger count in the upper and lower zones individually whereby the splitting of that bank of elevators into two banks for up peak zoning is instituted in response to a combination of traffic conditions in the upper and lower zone;

FIG. XIII is an across-the-line diagram of a portion of the program selection control as shown in FIG. XI modified for utilization in the second embodiment of this invention wherein the combination of traffic conditions in the separate zones alters the operating pattern;

FIG. XIV illustrates the car position sensing circuits and some of the circuits associated with the dispatching functions for a third embodiment of the invention wherein the upper dispatching terminal dispatch mechanism is utilized to control dispatching from the lower terminal during the zoned up peak operation;

FIG. XV is an across-the-line diagram of the indicators for the third embodiment of this invention; and FIG. XVI is an across-the-line diagram of the upper terminal dispatching circuits arranged for utilization as the secondary dispatcher at the lower terminal when the up peak zoned operation is effective.

Before proceeding with a detailed description of the circuits an explanation of the system and the method by which it has been represented is in order. The examplary embodiments each involve a system of four cars, cars A, B, C, and D. While individual circuits for the cars are set forth only once in most instances, where circuits or elements of two or more cars are shown the elements for a particular car are identified by the identifying letter as a parenthetical suffix. Since the system involves dividing the bank of four cars into two secondary banks and cars A and B have arbitrarily been designated as one secondary bank and cars C and D as the other, elements of one car of each bank have been illustrated as for cars A and C where necessary. The cars are illustrated as serving fourteen landings under the off hours, off peak, up peak, and down peak programs. Each car serves a lower dispatching landing and an upper terminal landing which can be a dispatching landing and twelve intermediate landings. While this arrangement has been chosen for simplicity of illustration, it is to be understood that landings below the lower dispatching landing and above the upper terminal landing can be provided and served by one or more of the cars. On the saturated up peak program the landings are divided into a lower zone comprising the lower dispatching terminal and the next six intermediate landings, floors 1 to 7, served by cars A and B and an upper zone comprising the landings above 7, 8 through 14, so that cars C and D primarily serve the lower dispatching landing and landings 8 to 14.

The circuit diagrams are of across-the-line type as to facilitate reading. As such the operating coils and motors are separated from the contacts which they actuate. Location of coils and contacts is by line number assigned to horizontal bands running across the drawings and indicated in key in the right hand margin. For example, FIG. I includes lines 1 through 26 and FIG. II lines 30 through 53. Each actuating coil or motor is indexed in the margin in horizontal alignment with its location in the drawing. Thus down leveling coil LD is indexed at line 11 of FIG. I. The contacts controlled by the coils and motors are shown in the position they assume when the coils are deenergized and the motors and relay armatures reset. Back contacts, those normally closed, and opened by energizing the coil or motor by which they are controlled are shown closed in the drawing and bear the reference character of their actuating coil or motor. They are associated with their actuating means by placing the underlined number of the line on which they appear in the marginal key adjacent the reference character for that means. Front contacts, those normally open and closed by operating of their actuating means also bear the reference character of that means. Those contacts are shown open and are indexed in the key by placing the line number of their location adjacent the reference character of the actuating means. Contacts of relay LD are indexed at line 11 as 4 and 6 and a normally closed LD contact appears at line 4 while a normally open LD contact appears at line 6. In view of the large number of actuating means, tables of their reference characters, a short name, and their line location are set forth for the first two embodiments disclosed in FIGS. I through XIII, Table A, and the third embodiment of FIGS. XIV through XVI, Table C. A number of contacts are shown for which the actuating means have not been set forth and these contact reference characters and the names of their actuating means are set forth for the first two embodiments in Table B and for the third embodiment in Table D.

The third embodiment utilizes much the same equipment as in the first two embodiments. Thus its car controls are as shown in FIGS. I, II, and III, its landing call controls are as FIG. IV, the low zone serving secondary bank is dispatched by the primary dispatcher circuits of FIGS. VI, VII and VIII with the elements of the high zone serving cars isolated therefrom as illustrated, the primary dispatch timer of FIG. IX is effective for the low zone cars, and the saturated up peak operating program can be established by any of the circuits shown in FIGS. X through XIII. Where it was advantageous to interrelate the drawings of FIGS. XIV to XVI with those of FIGS. I to XIII the contacts were indexed in the keys of FIGS. I to XIII as slanted line numbers to distinguish them from the contacts of the system of FIGS. I to XIII. Frequently a relay individual to a car and typical of similar relays for other cars was set forth only once. In such instances the marginal key indexing has been restricted to that for car A only. For example, a lower dispatch terminal relay MG at 114 is provided for each car and each car's MG contacts appears in FIG. IV as at 121, 124, 127, and 130, however, the marginal key at 114 indexes only the contact for car A at 121.

The relay and switch tables follow:

TABLE A

| Symbol | Name | Location |
|---|---|---|
| AMF | Above main floor | 30 |
| BK | Brake | 6 |
| BUR | Up run | 111 |
| BURE | Upper zone up run | 113 |
| CA(A) to (D) | Car available at lower dispatch | 140–146 |
| CB | Car signal above | 36 |
| CBD | Car signal below | 45 |
| CL | Door closing | 32 |
| CS | Car start | 9 |
| CUD(A) to (D) | Up dispatch (cars A to D) | 121–130 |
| CUL(A) to (D) | Up load car (cars A to D) | 133–139 |
| CULX | Up load car control | 156 |
| CULXE | Upper zone up load car control | 159 |
| CUN(A) to (D) | Lower terminal selection (cars A–D) | 141–147 |
| DF | Down generator field | 7 |
| DFU | Up dispatch timer holding | 182 |
| DFUA | Up dispatch timer holding | 180 |
| DFUAE | Upper zone up dispatch timer holding | 186 |
| DFUE | Upper zone up dispatch timer holding | 185 |
| DFUL | Up load control | 161 |
| DFULE | Upper zone up load control | 162 |
| DFUT | Up load control timer | 160 |
| DFUTE | Upper zone up load control timer | 163 |
| DL | Down signal direction | 20 |
| EZ | Upper zone car position | 14 |
| ELE | Upper zone car assignment | 110 |
| ELL | Lower zone car assignment | 109 |
| FLD | Full load dispatch | 150 |
| FLDE | Upper zone full load dispatch | 154 |
| G | Gate | 8 |
| HCT | Highest call | 86 and 88 |
| H1 | Saturated up peak program | 211 |
| H2 | Balanced program | 212 |
| H3 | Down peak program | 213 |

TABLE A —Continued

| Symbol | Name | Location |
|---|---|---|
| H4 | Off hours program | 214 |
| H13 | Zoned program | 215 |
| J0 | Up dispatch timer failure | 317 |
| J0E | Upper zone up dispatch timer failure | 324 |
| J1 | First up dispatch timer | 317 |
| J1E to J3E | Upper zone dispatch timers | 323-327 |
| J2 | Second up dispatch timer | 319 |
| J3 | Third up dispatch timer | 320 |
| KU | Up scheduling | 192 |
| KUE | Upper zone up scheduling | 188 |
| LD | Down leveling | 11 |
| LU | Up leveling | 10 |
| MG | Lower dispatch terminal | 114 |
| MGE | Upper zone indication | 15 |
| MGF | Stop time | 106 |
| MGFE | Stop time upper zone | 107 |
| MGFL | Stop time lower zone | 108 |
| MGX | Auxiliary lower dispatch terminal | 115 |
| MU | Moderate up service | 206 |
| MUE | Upper zone moderate up service | 235 |
| MUL | Lower zone moderate up service | 239 |
| OP | Door opening | 31 |
| PC | Master photocell | 26 |
| PCT | Passenger transfer timer | 25 |
| PCT1 | Passenger transfer | 23 |
| PS1A | Saturated up peak program selection | 218, 242 |
| PS1T | Saturated up peak program timer | 243 |
| PS2 | Balanced program selection | 222 |
| PS2T | Balanced program selection timer | 223 |
| PS3A | Down peak program selection | 220 |
| PS4 | Off hours program selection | 224 |
| PU | Up peak service | 205 |
| PUE | Upper zone up peak service | 234 |
| PUL | Lower zone up peak service | 237 |
| RL | Direction throwover | 19 |
| RLD | Down direction throwover | 13 |
| RLU | Up direction throwover | 18 |
| RSU | Lower rotary car selector | 164 |
| RSUE | Upper zone lower rotary car selector | 167 |
| RU | Lower selection control | 168 |
| RUE | Upper zone lower selection control | 171 |
| S | Landing signal stopping | 73 |
| SC | Stopping sequence | 35 |
| SD | Highest call slowdown | 82 |
| SS | Landing call indication | 92 |
| SSA | Landing call indication | 83 |
| TR | Standing time | 22 |
| UF | Up generator field | 5 |
| UL | Up signal direction | 21 |
| ULF | Up trip | 94 |
| USC | Up peak saturated service | 204 |
| V | Advance motor stopping | 34 |

TABLE B.—COILS NOT SHOWN

| Symbol | Name |
|---|---|
| AA | Acceleration. |
| AM | Auxiliary main switch. |
| AMR | Advance motor. |
| BP | By pass. |
| DS0-DS3 | Integrated stop time. |
| ECA | Threshold service. |
| EM | Emergency. |
| FD | Dispatch failure. |
| GS | Group service. |
| HC | Highest call. |
| HCR | High call reversal. |
| LBP | Load by pass. |
| LR | m.g. set run. |
| MG1 | Upper dispatch terminal. |
| PD | Peak down requirements. |
| PS1 | Clock program. |
| PS3 | Clock program. |
| RH3 | 3 rheostat. |
| STD | Top landing call down. |
| S2D-S13D | 2nd to 13th landing call down. |
| S13U-S1U | 2nd to 13th landing call up. |
| TRLA | Standing time saver. |
| VR1 | 1st vernier. |
| VR2 | 2nd vernier. |
| 2LD | Second leveling down. |
| 2LU | Second leveling up. |

TABLE C

| Symbol | Name | Location |
|---|---|---|
| BDR | Down run | 254 |
| BUR | Up run | 255 |
| CDD(A) to (D) | Down dispatch (cars A to D) | 302-309 |
| CDL(A) to (D) | Down load (cars A to D) | 295-301 |
| CDN(A) to (D) | Down next lantern control (cars A-D) | 290-293 |
| DFD | Down dispatch timer holding | 260 |
| DFDA | Down dispatch timer holding | 259 |
| DFDL | Down load control | 286 |
| DFDT | Down load control timer | 289 |
| MG | Lower dispatch terminal | 257 |
| MGX | Auxiliary lower dispatch terminal | 256 |
| MG1 | Upper dispatch terminal | 253 |
| MG1X | Auxiliary upper dispatch terminal | 252 |
| RD | Upper selection control | 285 |
| RSD | Upper rotary car selection | 281 |

TABLE D.—COILS NOT SHOWN

| Symbol | Name |
|---|---|
| AMR | Advance Motor. |
| BD | Down 2 car. |
| BP | By pass. |
| KD | Down scheduling. |
| K0 | Down dispatch failure. |
| K2 | Second down dispatch timer. |
| LW | Lead weighing. |

Description of FIG. I

For purposes of illustrating this invention it has been applied to elevator car controls wherein the lifting motor is of the D.C. type and is supplied from a generator. As schematically represented, a motor 401 drives the D.C. generator 402 through shaft 403. The generator 402 is coupled through its output leads 404 to a D.C. lifting motor 405. The armature shaft 406 of the lifting motor is coupled directly to the sheave 407 over which the cables 408 supporting the elevator car 409 and its counterweight 410 are trained. A brake drum 412 is secured on shaft 406 and is provided with a spring applied and electromagnetically released shoe 413. Operation of the several control circuits in accordance with effective car position is actuated through a commutating device commonly identified as a floor selector 414 comprising vertical columns of contacts or segments commutated by brushes mounted on a crosshead 415 moving along those columns. In the particular arrangement chosen for illustration the floor selector advances the crosshead with respect to the actual position of the car as represented on the selector 414. The floor selector contact array simulates a miniature elevator hatchway wherein the contacts are located at floor levels in aligned rows for the several circuit functions to be actuated when the car is effectively at a given level and the crosshead positions the brushes at those levels. While the car is stopped the crosshead is at the same effective position on the array as the car is in the hatchway so that the stopping of the car at the fifth landing stops the crosshead on the floor selector to enable circuits for the controls for the fifth landing. When starting the car, the crosshead is driven at an essentially constant speed ahead of the car by an advancer motor 416 whereby it moves in advance of the actual position of the car as represented on the floor selector contact array. Thus when the crosshead encounters a contact indicating the presence of a call for which the elevator is to stop, the advancer motor is deenergized to stop the crosshead and the car continues to move to the floor represented by the crosshead position. Slowdown controls operate as the car approaches that floor through a series of rheostat connections made through cam actuated contacts represented by contacts 417, 418 and 419. These contacts control the voltage applied to the shunt field of the generator 402 in accordance with the system disclosed in J. H. Borden Patent No. 2,685,348 which issued August 3, 1954 for Elevator Control System, wherein the advancer motor 416 and the lifting motor 405 jointly drive a differential 420 to control the cam shaft 422 and thus the contacts in the shunt field rheostat.

Direct current supplies the main leads R and B of FIG. I. Operation of the car is controlled initially by a car starting relay CS at line 9 when the car is not at a dispatching terminal and lower dispatch terminal relay MG and upper dispatch terminal relay MG1 are deenergized to close their contacts at line 9 or the car is at one of the dispatching terminals and its dispatch relay CUD for up dispatching or CDD for down dispatching at 8 and 10, respectively, have been energized. In addition, the emergency circuits must be energized to close contact EM, the doors of the car must not be opening so that door opening relay contact OPA is closed, and the start time relay TR must have timed out and closed its contact. Upon energization of relay CS it closes its contact at 6 which in conjunction with closed gate contact G and the closed landing interlock switches 421 enables the generator field relay UF or DF and the brake relay BK to be energized and thereby release the brake holding the car at the floor and initiate the operation of the lifting motor 405. So long as the MG set is running contact LR at 6 is closed. If the up signal direction relay UL is energized at 21 through the closure of contact of RL of direction throwover relay RL, up generator field relay UF at 5 is energized through contact UL at 5 and brake relay BK at 6 through the safety contacts and the motor generator run relay contact LR at 6 to lead R. Conversely, the motor can be set to lower the car through its down generator field relay DF at 7 if contact DL at 7 is closed by virtue of the resetting of the direction throwover relay RL to energize down signal direction relay DL at 20. If the brake relay is energized to close its contacts at lines 2 and 3, brake release solenoid 423 is energized to lift the brake shoe 413 from the brake drum 412 on the motor armature shaft. At this time, assuming that the up signal direction has been set and up generator field relay UF is energized, contacts UF at lines 1 and 2 are closed to energize the generator shunt field with a polarity to cause the lifting motor 405 to drive the armature shaft in a lifting direction. Advancer motor 416 is started at this time (by means not shown) to drive the crosshead 415 and differential 420 in the direction the car is set to travel. This imposes an accelerating voltage on the generator 402. The car therefore runs from the floor following the previously advanced crosshead 415 until that crosshead picks up a stopping signal on the floor selector machine.

Once a car advance motor is started to close contact AM at 24, relay TR is energized and opens its contact at 9 to drop relay CS. This opens the energizing circuit through CS at 7 employed in initiating car starting. However, a seal circuit is completed around the CS contact at line 7 by contact UF at 5 or DF at 6 and the closed leveling relay contacts LU and LD at 5. This seal circuit is enabled on stopping by the final leveling of the car to drop both LU and LD as will be described. LU and LD cannot be energized during the start of a car since relay V is deenergized to open its contact at 11. Upon initiating a slowdown for a stop the seal circuit for BK and UF or DF is opened by the entry of the car into the leveling zone to open contact LU or LD at 5.

Gate relay G appears at line 8 together with its gate contact 425 which is closed when the gate is fully closed on the car. Up leveling and down leveling relays LU and LD are shown at lines 10 and 11. These relays are enabled upon the pickup of a stopping signal through the closure of contact V at 11, as will be described, and are pulled in when their circuits are completed by the closure of the contacts HLU and HLD in the leveling units. These leveling units are mounted on the car and are magnetically actuated by being carried with the car into the range of magnetic influence of vanes positioned adjacent the respective landings in the hatchway along which the car travels. Thus as a car enters the leveling zone during an ascent, contact HLU is first closed by the entry of its actuating unit into the range of magnetic influence of the stationery vane in the hatchway and when the car is level with the floor HLU contact opens to deenergize the leveling relay LU. Similarly if the car is descending the contact HLD first enters the range of influence and relay LD is energized. While the car is level with the floor, the vane is positioned between the units HLU and HLD and both contacts are open so that both relays LU and LD are deenergized.

By reference to lines 4 and 6 it will be appreciated that with the leveling unit operative, when the car sinks below a proper level condition at a landing, contact HLU is pulled in by the movement of its actuating unit into the range of magnetic influence of the vane to pull in relay LU and close its contacts at line 4. If the rheostat shaft 422 has returned to its neutral or stopped position, cam 426 permits contacts 427 and 428 to close and closed contact LU at 4 completes an energizing circuit for the up generator field relay UF through the normally closed rheostat actuated contact 427 to energize relays BK and UF and cause the car to relevel. If the car is above the floor, the contact HLD is similarly closed to energize down leveling relay LD and close its contact at line 6, whereby the down generator field relay DF is energized and the lifting motor is caused to lower the car.

One column of floor selector contacts engaged by a brush 429 mounted on the crosshead 415 is shown at lines 13 through 18. Contact 430 is located at the lower limit of travel of the car the basement in a system serving a basement floor. Contact 431 is located at the lower dispatching floor which in the example can be considered to be the ground floor immediately above the basement. Contact 432 is located on the floor selector panel at the position corresponding to the next to the top landing in the local zone, the sixth landing. Contact 433 is at the position corresponding to the top landing in the local zone, the seventh landing. Contact 434 is at the position corresponding to the bottom landing of the upper zone and contact 435 is at the upper limit of travel. Thus when the crosshead is at the upper limit of travel brush 429 engages conact 435 to energize down direction throwover relay RLD at 13, provided the car is set for travel upward and its down signal direction relay DL is deenergized so that back contact DL is closed at 13. Upon energization of relay RLD it closes its contact at 18 to energize the reset coil of magnetic latch direction throwover relay RL at 19 thereby generating a magnetic flux sufficient to overcome the residual flux in the magnetic circuit of relay RL and to permit its armature to drop out to close back contact RL at 20 and open front contact RL at 21. In this manner the up signal direction relay UL is deenergized and the down signal direction relay DL is energized.

When the crosshead of a descending car reaches the position corresponding to the lower dispatching terminal on the floor selector brush 429 engages contact 431 to energize up direction throwover relay RLU at 18 provided no basement call is assigned to the car to open the contact BS at 17 and the car has its up signal direction relay deenergized to maintain back contact UL closed at 18. RLU when energized closes its contact at 19 to energize the pull in coil of direction throwover relay RL whereby front contact RL at 21 is closed and back contact RL at 20 is open to energize up signal direction relay UL and deenergize down signal direction relay DL.

Reversal of an up traveling car can also be accomplished by energizing high call reversal relay HCR to close contact HCR at 12. This energizes relay RLD to reset direction throwover relay RL and the up signal direction relay UL.

In accordance with the present invention the system can be divided into an upper and a lower zone of floors. Those floors are delineated through the engagement of contact 429 with the contacts 432, 433 and 434, respectively. In the diagrams magnetic latch relays such as the above discussed relay RL and relays MGE and EZ are depicted as having three leads extending from the circle in which their reference character is located. The two leads extending horizontally are the terminals of the energizing or pull in coil while the horizontal lead extending from the left and the vertical lead constitute a reset or canceling coil.

Relay MGE is pulled in while the car is at the top landing of the lower zone and throughout its travel in the upper zone and is dropped out while it is in the lower zone inasmuch as an ascending car when its crosshead is at the position corresponding to the top floor in the local zone carries brush 429 into engagement with contact 433 to energize the pull in coil of relay MGE thereby latching that relay in until the crosshead descends to the floor below the top floor in the lower zone and carries its brush 429 into engagement with contact 432 to energize the reset coil of MGE.

Relay EZ is energized only while the car is in the upper zone. Upper zone relay EZ is energized by the engagement of brush 429 with contact 434 at the bottom floor in the express zone and is pulled in thereby. It is reset by the engagement of brush 429 with contact 433 at the position corresponding to the top floor in the local zone. The functions of relays EZ and MGE will be understood more fully below.

Car starting and the control of the car gate and hatchway door is effected through the operation of start time relay TR and photocell relay PC at lines 22 and 26, respectively. While the car is running, contact AM at 24 is closed to maintain relay TR energized. When the car stopping operation is initiated contact TRLA at 22 is closed and remains closed until a passenger transfer or door closing operation is effected as best disclosed in Walter A. Nikazy Patent No. 2,758,676 of August 14, 1956 for Variable Standing Time Control. If relay TRLA opens its contact at 22 before the doors of the car are fully opened, TR is maintained energized until opening is completed by the contact OP at line 25. Further, if during any time the doors are open a safety switch for the doors is broken as by interruption of the light beam extending across the doorway, operation of a safety shoe on a leading edge of the door, or the operation of a door opening switch (none of which are shown). Relay EM will be deenergized to close its contact at line 24 and energize relay TR. Relay TR as set forth above institutes the operation of relay CS by dropping out and closing its contact TR at 10 a given interval after it has been deenergized and thus a given interval after a passenger transfer has been effected and the doors are completely open or a given interval after the emergency relay EM is reenergized.

One of the means of actuating the emergency relay EM (not shown) is a photocell relay PC at 26 controlled by a car photocell relay (not shown) having contact PCC which is closed so long as a light beam projected across the entry to the car remains unbroken and which is opened upon the breaking of that light beam and until it is reestablished. The relay PC functions in the safety circuits protecting passengers passing through the entry to the car from being struck by the closing door. It also can be used in counting passenger transfers or measurement of the passenger transfer interval. These conditions are fed to computing circuits which ascertain the traffic conditions imposed upon the elevator system.

*Description of FIG. II*

Additional control circuits for an individual car are shown in FIG. II. These circuits are supplied from a suitable alternating current supply through main leads P and Y. Above main floor relay AMF is energized while the car is above the main dispatching floor by means of a cam operated contact 436 which is closed while the crosshead is above the main landing position on the floor selector and opens as the crosshead descends to the main floor. A door opening relay OP at line 31 is energized to initiate the opening operation of the car gate and hatchway door as the car is about six inches from the floor at which it is to stop as indicated by the energization of the second up leveling relay 2LU (not shown) and a second down leveling relay 2LD (not shown) contacts of which appear at line 31. Relay OP remains energized during the opening of the door through the normally closed contact of door closing relay CL at 31 and is deenergized only as the door reaches its fully opened position and opens the normally closed limit contacts 437 at line 31. Door closing relay CL at line 32 is actuated by operation of the car starting relay CS to close its contacts at 32 provided the door open relay has been deenergized by having been fully opened to cause the closing of contact OP at line 32. Advance motor stopping relay V at line 34 controls advance motor 416 to stop the advancement of the crosshead 415 on the floor selector when a stopping signal has been picked up on either the landing or car call circuits. Pickup of a landing call is indicated by the operation of landing signal stopping relay S to close its contact at line 34 and energize relay V. Pickup of a car call energizes relay V by closing stopping sequence relay contact SC at line 33.

The remainder of FIG. II shows the car call circuits including those for sensing a car call above or a car call below the current effective position of the car, those for sensing the arrival of the crosshead at the position on the floor selector corresponding to a floor for which a car call is registered and the means to control the registration of car calls. Relay CB at line 36 senses the presence of car calls above the current position of the car. Floor selector 414 is provided with two series of normally closed cam actuated contacts. One contact in each series is provided for each of the floors intermediate the floors at the limits of elevator travel. One of these series of normally closed contacts, designated 438 and appearing fragmentarily from lines 37 through 42, represents the landings above the car and includes a normally closed contact for the top landing. The individual landings of these groups are indicated by the parenthetical numbers adjacent the contacts. Contacts 438 are connected to car signal above relay CB. The second group of contacts 439, also represented fragmentarily for but a portion of the total travel of the cars, includes a contact for the lowermost landing, in this instance a first landing identified by the parenthetical 1 and is connected to car signal below relay CBD at line 45. Cams 442 and 443 are carried by the crosshead 415 and actuate the contacts 438 and 439 respectively to isolate the current car position by opening the series of contacts 438 and 439. Cams 442 and 443 isolate the circuits for landings at and below the car from relay CB. Cams 442 and 443 isolate the circuits for landings above the car from relay CBD. In FIG. II the cams are illustrated for a crosshead position at the third floor. Thus, in the group 438 contacts for the second and third landings are opened, while in the group 439, contacts for the third and fourth landings are opened.

The system chosen for the present example consists of fourteen landings including a ground floor and thirteen landings above the ground floor. A car call button for each of the landings is provided in a main control panel 440 and an auxiliary control panel within the car. The main car buttons are shown from lines 37 through 42. Each of the car buttons is signified by the number of the landing for which it applies with the prefix C. Thus, the car button for the second landing shown at 42 is C2. The car button for the top landing is shown at 37 at CT. These buttons are held in electromagnetically by holding coils 445 at 47 to 53 which, during normal operation, continuously carry current limited by the resistors 446 to a level sufficient to hold the contacts closed magnetically once the buttons are depressed but insufficient to pull the push buttons in magnetically. The car calls can be registered from the auxiliary circuits however by bypassing and shunting the resistances 446 through the auxiliary car button contacts CTA at 46 for the top landing, for example, whereby sufficient current is passed through the holding coils 445 to pull in the main buttons magnetically and hold them in latched position. Reset buttons RT to R1 are also provided in series with the holding coils 445 whereby a car call can be reset by pressing the button to open the holding circuit as at RT for the top terminal, R7 for the seventh landing, R6 for the sixth landing and R1 for the first landing as shown fragmentarily.

Operation of car signal above relay CB is caused by the car buttons for the landings above the effective position of the car crosshead and its cams 442 and 443. Thus, if a car call were registered at the seventh floor to close contact C7 at line 38 and the crosshead were positioned as shown at the effective third landing position a circuit would be completed for a car set to ascend through the normally closed up next relay contact CUN and the normally closed down signal direction contact DL at line 36, coil CB, contacts 438 for the top through seventh landings, lead 447, car button C7, normally closed low zone contact ELL, to lead Y. In a similar fashion, a car call registered below the current position of the car causes car signal below relay CBD to be pulled in at line 45, provided no car signal above is registered to open normally closed contact CB at 45, through the contacts 439 to the car button. Consider, for example, the registration of a car call for the second landing by the closure of contact C2 at line 42 while the crosshead is located at the position corresponding to the third landing as shown in FIG. II. Under those circumstances the circuit through contacts 439 would be complete from the first landing contact (1), through the second landing contact (2) thence to lead 448, upper zone car assignment relay contact ELE, the car button C2 and lead Y.

Stopping of a car in response to a car call is effected through the energization of stopping sequence relay SC at line 35. Brush 449 is mounted on the crosshead of the floor selector machine to successively pass over a series of contacts 450 each fed from lead Y through main car button contacts for the several landings served by the car. Brush 449 is shown on the contact 450 for the third landing. If the car button C3 for the third landing at 41 were closed, relay SC would be energized through lead 452, lead 453, brush 449, contact 450 for the third landing, normally closed contact ELE of the upper zone relay, car button C3 and lead Y. The pull in of relay SC actuates relay V as indicated above to initiate the stopping of the floor selector crosshead and the slowdown of the elevator car to level at the third landing. The functions of the highest call contacts HC, high call reversal contacts HCR, lower zone relay contacts ELL, and upper zone contacts ELE, will be discussed below.

Registered car calls are reset at the end of each trip by the operation of the direction throwover relays RLD and RLU to open one of the back contacts at line 51 thereby deenergizing all of the holding coils 445.

*Description of FIG. III*

The lower portion of FIG. II illustrates the car button circuits for a car serving the upper zone of floors. FIG. III illustrates the car button circuit for a car serving the lower zone of floors. Its operation is much like that of the circuit shown in FIG. II and accordingly similar reference characters have been applied where appropriate. The circuits are arranged under certain modes of operation to exclude registration of calls within the cars serving the lower zone of floors for landings in the upper zone. These circuits appearing at lines 61, 62 and 63 will be discussed in more detail below.

*Description of FIG. IV*

FIG. IV illustrates portions of the hall call circuits for the elevator system with the landing signal stopping relay S for but a typical car being shown together with the highest call slowdown relay SD, the common landing call signal relays SSA and SS for the entire system, and individual highest call relays for a car adapted to serve the lower zone of floors and a car adapted to serve the upper zone of floors HCT(A) and HCT(C) respectively.

The means for registering up and down landing calls at the several landings are not shown in the present disclosure. However such means are well known and are disclosed in detail in the copending application Serial No. 808,290 which was filed March 30, 1959, for "Elevator Controls" in the name of R. A. Burgy, that application disclosing the basic system upon which the improvements of this invention can conveniently be superimposed. Contacts of the landing call signal relays are shown with the prefix S, the landing number, and a suffix letter U for up direction and D for down direction. Thus, an up landing call for the thirteenth landing, when registered, closes contact S13U at line 72 and opens normally closed contact S13U at line 83. Similarly, a down landing call at the thirteenth floor would close contact S13D at line 76 and open contact S13D at line 84.

Stopping circuits for the up traveling car are fragmentarily shown for typical floors at lines 70 through 74. A series of up landing call stopping contacts 455 are provided for engagement by up landing call stopping brush 456 carried on the crosshead of the floor selector. Similarly, a series of down landing call contacts 457 on the floor selector are arranged for successive engagement by the down landing call stopping brush 458 carried by the crosshead of that selector. Contacts 455 and 457 are connected in parallel for each car in the bank through the arrow-headed leads 459 for the up landing calls and 460 for the down landing calls. A car proceeding along the hatchway follows the corresponding travel of its crosshead a distance suitable for comfortable slowing down of the car when a call is picked up. Thus, if the brush 456 for an ascending car were to engage the contact 455 while an up landing call were registered at the sixth floor to close contact S6U in line 73, relay S would be energized through the circuit including normally closed low zone relay contact ELL or the shunting switch 462, up generator field relay contact UF, load bypass relay back contact LBP, normally closed contact VR2 of a second stopping sequence relay, not shown, closed contact RH3 of a rheostat relay, not shown, which is closed while the car is running at speed, and closed contact BP of a bypass relay, not shown, to the coil S and then through closed brake relay contact BK at line 73 to complete the circuit between the A.C. supplied leads GN and BR. As pointed out above, relay S when energized closes its contact in the circuit of stopping sequence relay V at line 34 to initiate the stopping operation of the car. In order to avoid having more than one car respond to a single landing call the landing call is cancelled as soon as a car responds to open contact S6U. Thus, a holding circuit must be maintained for the relay S until the car is fully stopped and the brake set when contact BK at line 73 opens to deenergize the relay S. This holding circuit is provided through the contacts at line 70 comprising first stopping sequence relay VR1 closed upon the initial operation of the stopping sequence and the landing signal stopping relay S so that the opening of contact S6U and subsequently in the operation of the stopping sequence the opening of contacts VR2 and RH3 will not cause the relay S to drop out.

As will best be appreciated from a consideration of the operation of this system in the saturated up peak mode, the landing signal stopping relay S is frequently disabled on up trips since the car is loaded beyond that degree which operates its load weighing switch so that its load bypass relay is operated to open contact LBP at 73, particularly until it has stopped for car calls and been partially unloaded.

A descending car is stopped in response to a down landing call through the energization of relay S in a similar manner. If a descending call encountered a down landing call at the sixth floor represented by closed contact S6D at line 80 the engagement of brush 458 with contact 457 at line 80 would energize the relay S through the leads 463 and 464 and thence through normally closed zoning program relay contact H13 or switch 465, which is closed for low zone cars and open for upper zone cars, and closed normally open contact ELL of low zone relay when the cars are operating under zone operation to lead 466 and thence through down generator field relay contact DF to the circuit including contacts LBP, VR2, RH3 and BP leading to the actuating coil of landing signal stopping relay S.

The landing signal stopping circuits are provided with a supplemental series of contacts on the floor selector machine, contacts 467 which are divided into a first group for the upper zone landings 7 through 13 and a second group for the lower zone landings 6 through 2. These contacts are commutated by the brush 468 carried by the crosshead of the floor selector. A descending car when in the express zone and when its contacts H13 and ELL or the switch 465 are open makes contact for the stopping circuits through the brush 468 to the upper zone contacts 467, thence lead 464, and 463 to the brush 458 and the landing call contacts 457. However, when that car is in the lower zone the landing call circuits are ineffective inasmuch as the brush 468 while making contact with the contacts 467 for the lower zone cannot complete the circuit in view of the open contact BPL. BPL is closed when the conditions warrant service by an upper zone car to lower zone floors as, for example, when calls remain registered in the lower zone of floors beyond a predetermined interval, all as measured by means not shown in the present disclosure.

The vertical column of landing call contacts extending from line 82 through line 93 serve several functions. When any landing call is registered under normal operations, the landing call indication relay SS is deenergized by virtue of the open back contacts for that landing call. Similarly, if an up or down landing call is registered in the high zone of floors or an up landing call is registered in the low zone of floors, landings 6 through 2, landing call indication relay SSA is deenergized at line 83. This relay is utilized when the bank of elevators is split to indicate to the cars serving the upper zone of floors that a hall call is registered to which they exclusively are capable of responding, inasmuch as the cars serving this upper zone of floors are the only ones arranged to serve all up landing calls and down landing calls in the upper zone. The drop out of either relay SS or SSA indicates to the dispatcher or dispatchers that a car should be released if one is available for travel.

The series of normally closed landing call signal relay contacts are also employed to sense the existence of landing calls above the effective position of the car. When such calls exist the highest call relay HCT for the car is deenergized and once the car has reached the highest down landing call or has traveled above the highest registered up landing call HCT becomes energized provided no car calls are registered above the car position. Each floor selector panel is provided with a column of high hall call contacts 469 those for car A in FIG. IV being shown as 469(A) those for car C being shown as 469(C). These contacts are provided for each of the intermediate landings served by the cars and are connected at the junction between the up landing call and down landing call contacts for the respective landings. Thus, contacts 469(A) and 469(C) are connected in parallel for cars A and C and for the thirteenth landing are connected in the normally closed series of landing call relay contacts at the junction 470 between contacts S13U and S13D. A down landing call at the thirteenth floor requires no further upward travel of the car and therefore when a car has attained the thirteenth floor and has no call above the thirteenth and only a down landing call at the thirteenth its relay HCT will be energized. An up landing call at the thirteenth requires further travel upward and relay HCT remains deenergized inasmuch as the contact S13U interrupts the circuit to lead GN. Initially, disregarding the contacts H13, MGE, H3, ELL, and H2, it will be noted that the brush 472 cooperating with the column of contacts 469 is connected through a normally open BP contact at 86 of a bypass relay to the actuating coil HCT and thence to the lead BR through the normally closed contacts of an acceleration relay AA (not shown but which is normally closed when the car is running), a normally closed VR2 contact (which is closed except when the car is slowing down for stopping), an up generator field relay contact UF (which is closed while the car is ascending), and a normally closed car signal above relay contact CB (which is opened only when a car call above the current effective position of the car is registered). Thus, an ascending car will have its highest call relay energized when its crosshead reaches an effective position at the highest down landing call, highest down car call, and above the highest up hall call. Energization of this relay under certain operating programs initiates the reversal of the car.

When a highest call relay HCT is energized it energizes highest call relay HC (not shown). HC closes its contact at 82 to enable energization of highest call slowdown relay SD when a down landing call is encountered by brush 458 through a segment 457. HC closes its contact at 40 to energize stopping sequence relay SC for a low zone car having its contact ELL closed on the zoned program. This limits travel of low zone cars to the low zone and reverses them at the top of that zone. Reversal of a car is effected by energization of high call reversal relay HCR (not shown) which operates direction throwover relay RL to set the car for travel downward and operate its down signal direction relay DL all in a manner not shown. With no landing calls in registration, a car will stop at its highest car call to energize relay SC and energize relay HCR by means not shown whereby the direction throwover is effected. Thus high call reversal ordinarily occurs only at a highest down landing call or a highest car call when no other call is above which the car can answer and the high call reversal circuits are employed during zoned operation to insure reversal of a low zone car at the top of its zone.

*Description of FIG. V*

The direction a car is set to depart from a landing is indicated by illumination of an up or a down lantern positioned adjacent the car entry. Up lanterns for the thirteenth and second landings L13U and L2U and a down lantern for the thirteenth landing L13D are illustrated as typical. The up lanterns are actuated through the floor selector by means of circuits established through contacts of the column of up landing signal contacts 473 and the cooperating crosshead borne brush 474. This circuit is active when the brush 474 engages the contact 473 for the effective position of the car upon the initiation of the stopping sequence for the car as indicated by the drop out of the advance motor relay and the closure of its back contact AMR at line 100, provided the car is traveling upward so that the RL contact at 100 is closed, the car is not bypassing so that contact BP is closed, and car start relay CS is deenergized to close contact CS. Relay AMR is energized while the advance motor is driving the crosshead and therefore drops out when a car picks up a stopping signal to enable the lantern circuits for a stopping car before it reaches the landing. The lantern remains illuminated to indicate that the car will leave the floor in an upward direction until the car starting signal is issued and normally closed contact CS is opened. A similar arrangement of down landing lanterns is provided for each car and is actuated through a column of floor selector contacts 475 corresponding to the contacts 473 and a brush 476 corresponding to the brush 474 but connected to the actuating circuit through a normally closed contact of the relay RL at 101 such that those lanterns are lit when the car is assigned to stop and until it begins to travel away from the floor when set for downward travel.

Indicators for the individual cars at the loading floor or lower dispatching floor are shown in lines 103, 104 and 105. The car which is to be loaded during a dispatching sequence has a sign over its doorway labeled "This Car Up" illuminated by virtue of the assignment of the car to the up load status as determined by the dispatching mechanism, to be discussed, to energize its up load relay CUL and close contacts CUL at line 103.

These indicators are effective for several operating modes. In some instances such as balanced operation the "This Car Up" sign of each car is illuminated as it is assigned the loading status. On down peak operation when zoning is effective the low zone cars do not serve up traffic and their "This Car Up" signs are ineffective since contact H1 at 102 is open for all cars and contact ELL at 103 is open for the low zone cars. High zone cars have their ELL contacts closed if each car is supplied with a lower zone car assignment relay since their zone assignment switch (not shown) in series with that relay will be open to prevent its operation by the programming relays. Alternatively cars permanently assigned to high zone operation can have the parallel H1 and ELL contacts at 102 and 103 replaced by a jumper. On the saturated up peak program where two dispatch systems are employed the load status cars for upper zone service operate as described while those for lower zone service are operated by the closure of contact H1 at 102 to bypass their open ELL contacts.

At 104 another sign is shown which is available for indicating that the car with which it is associated is the next to be advanced into the up load status. That sign is located so as to be visible to prospective passengers in the corridor at the dispatching landing to direct those passengers into the car which will next be assigned the load when it becomes apparent the load car will be filled before they can enter. This sign, which can display the legend "This Car Next," is effective on the saturated up peak program when contact H1 in line 104 is closed and when a car is in selected as next to be conditioned for departure, as indicated by the closure of its contacts CUN. Each of the dispatching systems effective at the lower dispatching terminal on the saturated up peak program has an up load relay contact to actuate the "This Car Up" sign for the load car and a lower terminal selection relay contact CUN to actuate the "This Car Next" sign of the car next to be advanced into the up load status.

Since the system is arranged such that service from the lower floor upward is restricted to a zone of floors for each car, a sign is provided to indicate the floors to which service is available. The zone sign of each car has an appropriate designation thereon which is illuminated by the closure of contact H1 of the saturated up peak program relay at line 105 when the car's advance motor relay AMR is deenergized, indicating the car is about to stop or has stopped, and the car's MG relay is energized, indicating that the car is at the lower terminal.

The traffic condition sensing means illustrated in this disclosure senses the time that cars are stopped at landings intermediate the dispatching terminals. Starting time relays MGF, MGFE and MGFL individual to the cars are provided to indicate those stops. These relays are energized when the cars are operating in group service as indicated by the then closed group service relay contact GS in line 106, provided the cars are not at the upper or lower dispatching terminals as indicated by the closed contacts MG1 and MG, respectively, both at 106, whenever the advance motor relay AMR is deenergized to close contact AMR at line 106. MGFE is energized while the car is stopped at a landing other than the upper dispatching landing in the upper zone of floors by virtue of closed contact EZ which, as described with reference to FIG. I, is energized as the car enters the upper zone and remains energized until the car leaves the upper zone. Conversely, contact relay MGFL at line 108 is energized while the car is not in the upper zone and is stopped at landings other than the lower dispatching landing since the relay EZ is deenergized at this time to close contact EZ at line 108.

Zoning relays ELL and ELE at lines 109 and 110 are effective for assigning the cars to their respective zones of operation, an ELL relay being provided for each of the low zone cars and introducing certain of the cars into low zone operation, and an ELE relay being provided for certain other of the cars and introducing them into high zone operation. Since it is desirable that the changeover in the mode of operating the system be effected without disrupting the current service being provided, the relays ELL and ELE are arranged such that they cannot be energized until the last car call registered in the respective car has been cancelled. This is indicated by the dropping out of the relay CB for car calls above that car and CBD for car calls below that car to close the back contacts CB and CBD in line 109 for relay ELL and in line 110 for relay ELE. When the zoned program relay H13 has been energized, as will be described below, the circuit for energizing relay ELL is activated through the closure of contact H13 in line 109. Once a car adapted for serving the lower zone of floors has been conditioned to serve such floors, it seals itself in through seal contact ELL in line 108 until the program is altered to drop out zoned program relay H13. Similarly, the upper zone relay energizing circuit is enabled when the saturated up peak program relay H1 is energized at 110 and remains in through its seal contact ELE at line 111 until the system is transferred from the saturated up peak program and contact H1 is opened.

The departure of cars from the lower terminal is indicated under normal operation by the relay BUR common to all the cars through the completion of an energizing circuit from lead GN to BUR at line 111, through up generator field relay contact UF at 111, to floor selector contact 478(A) which is engaged by brush 479(A) when the crosshead for the car passes slightly beyond and above the position corresponding to the lower dispatching floor, through the group service relay contact GS at 114, the dispatch failure relay contact FD in that line, and the manual dispatch button 480. The relay BUR functions to reset the dispatch time interval as a car departs from the floor as will be described below. When the system is altered to provide service for a saturated up peak condition and the cars are arranged to serve zones on their upward trips, a second up run relay BURE for the cars serving the upper zone of floors is provided. This relay is connected to the floor selector contacts 478(C) corresponding to 478(A) for car C and the other cars capable of serving the upper zone of floors. Under normal operation the contact 478(C) is in parallel with the contact 478(A) and actuates BUR when any car departs from a lower floor through the car's closed UF contact and in the case of those cars arranged for upper zone service through the normally closed contact H1 at line 112. However, on the saturated up peak program the normally closed contact H1 of the upper zone cars is opened at line 112 and a normally open H1 contact at line 113 is closed to transfer the response to car departure to relay BURE.

Terminal position indicating relays MG and MGX individual to each car are energized when the individual cars have their crossheads positioned at the point corresponding to the lower dispatching terminal by virtue of the engagement of the brush 479(A) with floor selector contact 482(A). Thus, while a car is at the lower terminal, is operating in group service so that contact GS at line 114 is closed, if the group of elevators is providing service so that contact FD in line 115 is closed, and if the group has not been manually dispatched through operation of contact 480, the car will have its MG relay energized and until it has received its up dispatch signal it will have its MGX relay at line 115 energized through up dispatch relay contact CUD.

*Description of FIG. VI*

The dispatching circuits for a four-car bank of elevators are illustrated in FIG. VI. The relays CUD are the up dispatching relays. The relays CUL are the up load relays which are energized while the car is conditioned to receive a load and is the next to be dispatched upward. The CA relays are the car available relays and indicate that a car is available at a lower terminal and the CUN relays are the car selection relays actuated to indicate that the car is next to be sent away from the lower dispatching floor either as a car traveling to the basement in a system wherein basement service is provided or a car advanced into up load status where no basement service is required and the up load status is vacant.

As noted with respect to FIG. V upon the arrival of a car at the lower dispatching terminal the relay MGX for that car is energized. Thus, considering operation of car A, contact MGX(A) in line 141 is closed. This energizes the car available relay CA(A) for car A at line 140 which in turn initiates the selection of a car by energizing a selector mechanism RSU appearing at line 164 in FIG. VII. When RSU closes its contact for car A in line 141 the up selection relay CUN(A) for car A is energized to close a contact in line 133 in the circuit for the up load relay CUL(A) of car A. If no other car is in the up load status, contacts DFUT in lines 135 and 136 are closed and the relay CUL(A) is energized to place car A in the up load status, light hall lanterns indicating that it is the next to leave the floor, and prepare it for dispatching. The up load relay seals itself in by closing its contacts CUL(A) at line 132. It releases the up selection relay CUN(A) by opening a back contact CUL(A) in line 141 and it prepares a circuit for the up dispatching relay CUD of car A by closing a contact CUL(A) at line 121. Inasmuch as the car is standing at the lower floor, contact MG(A) at 121 is closed and the circuit through CUD(A) from lead GM to BR is dependent only upon the energization of up scheduling relay KU to close its contact at 124. Contact KU is controlled by a dispatch timer to be described below.

When an up dispatch relay is operated, as CUD(A) it resets the up load relay CUL(A) by opening the auxiliary lower terminal position relay contact MGX(A) at 141 by opening contact CUD at 115 to deenergize relay MGX. Another car can then be accepted in the up load status through closing of contacts DFUT at 135 and 136 and issued a dispatch signal either a dispatching interval after the preceding signal or a dispatching interval after the departure from the terminal of the preceding dispatched car, whichever occurs later. Departure of a car from the terminal opens its MG contact to reset its up dispatch relay by opening contact MG(A) at 121.

Under the saturated up peak condition the up peak program relay H1 is energized in a manner to be described. In accordance with this invention during the saturated up peak condition the bank of elevators is split into two separate banks, one serving an upper zone of floors, the other serving a lower zone of floors, and each bank is separately dispatched from the lower dispatching terminal. In order to do this the dispatching system disclosed in FIG. VI is split into two systems such that cars A and B serve the lower zone of floors and cars C and D serve the upper zone of floors. Considering first the up selection relays, it is to be noted that relays CUN(C) and CUN(D) are energized by the rotary dispatch selector RSU contacts through an H1 normally closed contact at line 145. When the saturated up peak program relay is energized, that contact is opened and an H1 normally opened contact at 148 is closed to provide an alternate energizing circuit which can be completed through a rotary car selector individual to the upper zone cars and having contacts RSUE at lines 146 and 148. Similarly, the up load relays for cars C and D are, under usual operation, energized through the contacts DFUT and a normally closed contact H1 at line 136. When the saturated up peak program relay is energized contact H1 at 136 is opened and contact H1 at 137 is closed to provide an alternative energizing circuit for the up load relays of cars C and D. This circuit is completed through the up load control timer for the upper zone having contacts DFUTE at lines 137 and 138 and functions in the same manner as DFUT to prevent the admission of more than one car at a time to the up load status. Similarly, the up dispatching relays for cars C and D are separated from the up dispatching relays for cars A and B by the opening of contact H1 at 126 when the saturated up peak program relay is energized and by the closing of contact H1 at line 127 the energization of these relays is made dependent upon the closure of contact KUE at line 127 of the upper zone scheduling relay which in turn is dependent upon the operation of an upper zone dispatch timer as will be described.

*Description of FIG. VII*

Certain adjuncts to the dispatching circuits are shown in FIG. VII. When a car is loaded to a certain percentage of its full capacity there is little point in detaining it at the lower dispatching terminal to complete its loading inasmuch as it would entail an excessive delay of service to the passengers already within the car. Accordingly, the loaded car is expedited in its departure ahead of the usual timing interval. It has also been observed to be desirable to dispatch a car ahead of its normal timing interval when a moderate level of down traffic is sensed and two or more cars are present at the lower dispatching terminal inasmuch as this indicates that cars are accumulating at that terminal when they could better be used to supply the transportation downward. Relay FLD in line 150 provides both of the above functions in the circuit disclosed. Each car has a load weighing switch LW in series with a contact of the up load relay CUL for that car so when the car is in the load status and receives a predetermined loading, ordinarily 80 percent of full capacity, a series circuit of a normally open LW contact and a normally open CUL contact is closed. Series circuits of this type are connected in parallel for each car together with a circuit shown at line 155 comprising a normally open contact of a moderate down traffic relay MD and a normally open contact of an up two car relay BU2. When a moderate level of down traffic is sensed, MD is closed and if the up two car relay (not shown) is enabled, as is the case on the balanced program of operation when two or more cars are present at the lower dispatching terminal, relay BU2 is energized and contact BU2 is closed to complete the full load dispatch circuit to lead 480 despite the absence of a full load on the load car. In either instance the car in the load status will be accelerated in its dispatch by the operation of relay FLD through one of the series circuits of CUL for the load car and a normally closed gate relay G for that car indicating that the car is in the load status and that its gate is open. Each of these circuits is arranged in parallel for the several cars of the bank. The full load dispatch relay speeds up the up dispatch timer as will be described.

As with the dispatching circuits, when the saturated up peak condition is introduced and the bank of elevator cars are split into separate groups being dispatched to an upper zone and a lower zone of floors, the up peak program relay separates the several cars into two groups actuating individual full load dispatch relays. Operation of the up peak program relay H1 opens back contacts H1 in lead 480 and H1 in lead 481 to separate the load weighing circuits for cars A and B from those for cars C and D. While the closure of contact H1 in line 154 renders upper zone full load dispatch relay FLDE effective to control the portion of the bank of elevators split off into the group serving the upper zone. Under these conditions the up two car relay BU2 is rendered inoperative inasmuch as it is effective only on the balanced program of operation. Therefore, the circuit at 155 has no effect on full load dispatching.

The dispatcher to which the invention has been applied will release cars from the lower dispatching terminal only when a call is in registration to which the car in the load status can respond, either a hall call or a car call in the load car. Accordingly, when no calls are in registration the dispatcher is stopped prior to the issuance of a dispatch signal to the load car despite the presence of one or more cars at the lower dispatching terminal. The sensing of a car in the load status is accomplished by the load car control relay CULX at 156. This relay is energized from any one of a group of parallel up load relay contacts individual to each of the cars in the group. Its function will be described below. When the group is split into two dispatching groups by the introduction of the saturated up peak program and the operation of program relay H1, an auxiliary up load car control relay for the upper zone group is introduced to respond to the cars in that group through the contacts CUL(C) and CUL(D) at lines 158 and 159. At the same time the cars serving the lower group, cars A and B, are isolated in their up load control relay operations to control only relay CULX at 156. These changes in circuit are accomplished by the opening of back contact H1 at 158 and closing of front contact H1 at 159.

In sequencing the dispatching of a car through the up scheduling relay KU at line 192 of FIG. VIII it is desirable that that relay should be reset before the car which is selected at the bottom terminal as next to be sent away from that terminal by virtue of its operated CUN relay is advanced into the up load status. This sequence is accomplished by the operation of up load control timer DFUT and up load control relay DFUL at lines 160 and 161, respectively. Up load control timer DFUT is energized directly by the entry of any car into the up load status through the closure of its CUL contact in the parallel grouping from line 160 to 163. When a car is advanced from the up load status to a dispatched state and its CUL contact opens, the up load control timer delays its dropout for a predetermined interval. The up load control relay DFUL at 161 is also responsive to the presence of a car in the up load status through the parallel grouping of CUL contacts at lines 160 through 163 and through the up load car control contact CULX at line 161. Thus, DFUL is energized slightly after DFUT. Upon the transfer of a car from up load status to up dispatch status relay DFUL drops to close its back contact at 193. At this time DFUT has its armature held in and contact DFUT at 193 is closed. Accordingly, a reset circuit for up scheduling relay KU is completed and KU is reset before DFUT drops out to close its contacts at 135 and 136. In this manner a second car cannot advance into load status before KU is reset and cannot inadvertently be dispatched on the signal issued to the preceding load car.

When the saturated up peak condition prevails and up peak program relay H1 is energized a second up load control timer DFUTE and an up load control relay DFULE are introduced for control of the group of cars serving the upper zone of floors while the primary timer DFUT and relay DFUL are retained for control of the cars serving the lower group of floors. Upper zone up-load control timer DFUTE appears at line 163 while upper zone up-load control relay DFULE appears at 162. These two elements respond to and control cars C and D upon the operation of relay H1 to open its contact in line 162 and close its contact at line 163.

As mentioned with respect to the dispatching circuits of FIG. VI, a bottom terminal car selector is provided to select an available car when one is required in the sequence of sending cars away from the lower dispatching terminal. The bottom terminal selector RSU at line 164 performs this function when a car is available at the lower dispatching floor to energize its car available relay CA and close one of the parallel group of CA contacts appearing from lines 164 through 167. When RSU is energized it causes the stepping of a rotary selection switch to occur and successively closes contacts RSU at lines 141, 143, 145 and 147 of FIG. VI. When the RSU contact associated with a car which is available at the lower terminal, a car having its MGX and CUL contacts closed, is closed, that car's lower terminal selection relay CUN is energized. This disables further stepping of RSU by energizing the up-selector control relay RU through the closure of one of the parallel group of CUN contacts at lines 168 through 171. When energized, RU opens its contacts at lines 164 and 165 to deenergize RSU thereby terminating its stepping operation and maintaining it in a position to hold the contact associated with the now selected car closed.

On the saturated up-peak program, duplicates of RSU and RU are introduced into the circuit and RSU and RU are rendered effective only for the cars serving the lower zone of floors by operation of contacts H1 at line 166 to isolate the car available relay contacts for cars A and B from those for cars C and D, and by the closure of contact H1 at line 167 to introduce RSUE for the lower terminal car selection control for the cars serving upper zone. Similarly, RU has its CUN actuating contacts for cars A and B isolated to render it effective only for the cars serving the lower zone of floors by the opening of contact H1 at line 170 while RUE, the lower selection relay for cars serving the upper zone of floors, shown at line 171, is introduced into the circuit by the closure of contacts H1 at 171.

*Description of FIG. VIII*

Additional adjuncts to the dispatching operation of the system are shown in FIG. VIII. The dispatch timer employed to illustrate this invention is arranged to run through a portion of its cycle even though no car is available at the lower dispatching floor to be dispatched. However, if, at a given point in the dispatching interval, no car is available, the timer is detented, that is, it stops timing and retains a portion of an interval which must be measured after the first car arrives. Dispatch timer holding relays DFUA and DFU at lines 180 and 182 perform these detenting functions. In the absence of a car assigned to the up-load status, the relay CULX at line 156 is deenergized and its normally closed contact at line 180 is closed. If the up dispatch timer is operative, up dispatch timer relay J0 is energized and its contact at line 182 is open, as will be described. Dispatch control relays J1, J2 and J3 are each energized a given interval after the initiation of a dispatch timing cycle. At the time that J2 is energized its contact at line 180 is closed. If no car is in the load status at that instant, relay DFUA is energized to close its contact at line 181 and energize relay DFU. Relay DFU establishes a holding circuit on the up dispatch timer which prevents the loss of the measured interval in the timer and bars further interval measurement by the timer. When a load car becomes available or if a load car is available at the J2 energizing point, contact CULX is open and relay DFUA is deenergized. However, relay DFU, which is the primary control of the dispatch timer, will not be deenergized unless either a hall call is in registration to deenergize the relay SS and open its contact at line 182 or a car call for a landing above the car is registered in the car assigned the load status to open the CB contact of the load car at line 183 paralleling the open CUL contact of that car in line 182. Upon registration of a call, relay DFU is deenergized and the up dispatch timer is permitted to complete timing its dispatch interval.

When the bank of cars is split for saturated up peak operation, the up dispatch timer holding relays DFUA and DFU are utilized to control the dispatch timer controlling the secondary bank of cars serving the lower zone of floors and an auxiliary set of up dispatch timer holding relays DFUE at 185 and DFUAE at 186 are introduced into the circuit to control those cars serving the upper zone of floors. This isolation of control is effected by the operation of up peak program relay H1 which opens its back contact at line 183 to separate the up load relay contacts and car call above relay contacts of cars A and B from those of cars C and D, whereby cars A and B remain in the circuit of relay DFU. Contact H1 at line 182 is closed at this time to connect the up load and car call above contacts of cars A and B to lead GN, whereby that circuit is rendered operative. Contact H1 at line 184 is closed to connect the up load and car call above contacts for cars C and D to up dispatch timer holding relay DFUE serving the cars for the upper zone of floors, this connection being effected through the normally open SSA contact which is dropped out when a landing call is registered which a car serving the upper zone of floors is capable of serving. It will be appreciated from a consideration of the circuit shown in FIG. IV that relay SSA at line 83 is responsive to up hall calls in the lower zone of floors through the contacts S6U through S2U, at lines 83 and 85, and to both the up and down landing calls for all floors in the upper zone, thus, to contact S7D through S1D in the upper zone, thus, to contact S7D through S13U. This operation of SSA is effected by the closure of contact H1 at line 84 to shunt the SS contact at line 83. The control of relays DFUE and DFUA for the cars serving the upper zone of floors is effected through a dispatcher adapted to serve only those floors and controlling contacts of relays J0E, a back contact of which is shown at line 186, and J2E, a front contact of which is shown at line 185, corresponding to the contacts J2 and J0 at lines 180 and 182, respectively.

With regard to the operation of the dispatch timer holding relay DFU when the saturated up peak condition prevails, it should be noted in FIG. IV that the relay SS is responsive only to down landing calls in the lower zone of floors, by virtue of the operation of master zoning relay H13 which closes its contacts to bypass the up landing call contacts in the series circuit of normally closed contacts for the low zone and connects the circuit to main lead GN at the top of the low zone as at 87, 88 and 91. SS at 92 is energized until a down landing call is registered to open one of the down landing call relay contacts at 87 to 92. Thus, the detenting of the dispatcher for cars serving the lower floors is released only when a car call for a landing above is registered in the up load car of that group or when a down landing call is registered in that group to drop out the relay DFU and permit the dispatcher to issue a starting signal.

As discussed with respect to the dispatching circuits of FIG. VI, the issuance of a dispatch signal through the operation of one of the up dispatching relays CUD is triggered by the closure of contact KU at 124. The up scheduling relay KU is shown at line 192 of FIG. VIII. It is of the magnetic latch type, wherein the opposed horizontal leads are the energizing terminals for the pull-in coil and the vertical lead and the right hand horizontal lead are the energizing terminals for the reset coil. That relay is energized when the dispatch timer terminates its dispatching interval definition and operates third dispatch control relay J3 provided the up dispatch holding relay DFU is deenergized to close its contacts at lines 191 and 192. This energization occurs through the closed contact J3 at 192. In the event of a dispatch failure, the dispatch failure relay J0 is deenergized to close its back contact, normally open during the proper operation of the dispatcher, to complete a circuit at line 191 for the relay KU.

The scheduling relay and, as will be described below, the dispatcher are each reset twice during a normal dispatching cycle, first when the load car receives its dispatch signal and second when the load car departs from the dispatch floor in the direction it was dispatched. As noted with respect to the description of FIG. III when a car receives its dispatching signal, its lower dispatching terminal relay MGX is deenergized to deenergize its up load relay CUL at lines 133 through 139. This deenergizes relays CULX at line 156, DFUL at line 161 and DFUT at line 160, all in FIG. VII as described. Relay DFUL drops out immediately closing its contact at line 193. DFUT, which is of the slow dropout type, holds its armature in for a given interval and therefore maintains contact DFUT at line 193 closed for that interval. Thus there is an interval during which the series contacts DFUL and DFUT at line 193 are closed simultaneously to complete a reset circuit for the up-scheduling relay KU, thereby resetting that circuit. When the car has closed its doors and started away from the floor, the relay BUR of the up-run relay in FIG. V at line 112 is closed at line 194 to again reset up scheduling relay KU. Thus, under ordinary circumstances the dispatch interval will be measured from the departure of the next preceding car in the dispatching sequence, but in the event that that next preceding dispatched car does not leave the dispatching floor an interval will be measured from the instant it was dispatched and the next succeeding car will be sent away at the end of that interval.

On saturated up-peak operation with two groups of cars being dispatched, a supplemental up-scheduling relay KUE is provided for the cars serving the upper zone of floors. This relay is shown in line 188 and corresponds to KU at 192 in all respects, the relays actuating KU being duplicated for the upper zone of cars and indicated by the suffix letter E. As in the case of those cooperating upper zone relays, the operation of up peak program relay H1, to close its contact at line 188, activates up scheduling relay KUE.

Description of FIG. IX

FIG. IX shows two lower terminal dispatch timers of the type suitable for use in this invention. Dispatch timers of this type have previously been disclosed in detail in the aforementioned Burgy patent application, Serial No. 808,290, filed March 30, 1959 for Elevator Controls. They comprise a triode connected pentode having a group of relays in the cathode-anode circuit which pull in at different levels of cathode-anode current and a means to gradually raise the level of such cathode-anode current through a condenser timing circuit which progressively raises the potential on the control grid. In the example, a minimum level of cathode-anode current continuously flows through the tube indicating that the tube is operative. This current is sufficient to operate the dispatch failure relay J0, thereby indicating that the dispatch timer is operative. Upon the dropout of J0 indicating that the dispatch timer has failed alternative circuits for starting the cars are set up by closing back contacts J0 at 182 and 191 to enable the detenting relays DFU and DFUA and the up scheduling relay KU even though the timed relays J2 and J3 were inoperative.

The primary dispatch timer 489 defines the dispatching intervals for cars dispatched from the lower dispatching floor while they operate as a single primary bank during the programs usually having up dispatching such as the off hours, balanced, and up peak programs. During the saturated up peak program the dispatch timer 489 serves as a secondary dispatch timer and times the dispatching interval for the secondary bank of cars serving the low zone of landings. Timing operations are reflected in the elevator control through the operation of first, second and third up dispatch timer relays J1, J2 and J3, respectively. These relays pull in at different levels of current, J1 pulling in at a first relatively low level, J2 pulling in at an intermediate level and J3 pulling in at a relatively high level. The current levels flowing through these relays is determined by the potential applied to the control grid 490 of vacuum tube 491 and thus in turn upon the potential appearing on the lead 492. The potential on lead 492 increases as a function of time determined by the degree of charge in condenser 493. Charging current for condenser 493 is derived from a number of voltage dividers, all of which are supplied with direct current through rectifier 494 from transformer 495. A first voltage divider comprising a section of resistance 496 shown above the lead 492 and a section of resistance 497 below the lead 492 charges the condenser at a rate determined by the amount of resistance in the section 496, this resistance level in turn being dependent upon the integrated stopping intervals of the elevator cars as described in the aforenoted Burgy application and represented by a first minimum level of stopping at which the contact DS0 is closed to short out a major portion of resistance 496, a second level of integrated stopping wherein the contact DS0 is open and the contact DS1 is closed to insert a somewhat greater resistance in the section 496, a still higher level of integrated stopping time wherein the contact DS2 is closed and both DS1 and DS0 are open and a fourth level of integrated stopping time where the contact DS3 is closed and the contacts DS0, DS1 and DS2 are open and a maximum level of integrated stopping time where none of the DS contacts are closed. In each instance the greater the amount of resistance in section 496 the slower the rate of charging of the condenser 493 and the longer the dispatching interval measured to the pull in of relay J3.

Once the charge has developed sufficient cathode current to pull in J2 and close its contact at 312 much of resistor 496 is eliminated from the charging path for condenser 493. A loaded load car will complete this same circuit by closing contact FLD at line 312. A voltage divider is also formed by the resistors 499 and 600 paralleling resistors 496 and 497 under certain conditions of operation of the detenting relays. Thus when no load car is available at the lower dispatching floor, the dispatch timer is detented before it reaches the dispatch point. Upon the operation of J2 relay DFUA is energized to close its contact at line 319 and connect the voltage 499—600 into the circuit to limit the potential imposed on lead 492 to a level below that necessary to draw an anode-cathode current at a level required for the pull in of relay J3. Similarly, the potential on lead 492 is established at the relatively low level in the event that no call is in registration requiring the services of a car at the lower dispatching terminal. This is accomplished by the operation of relay DFU to close its contact at line 318 and the operation of third up dispatch timing relay J3. Once the relay J3 has been pulled in, it can be held in by the anode-cathode current level established by the reduced grid potential of the voltage divider 499—600. Thus relay J3 is sealed in while the current flowing through the tube 491 is held at a level which is not detrimental to tube life.

Another mode of controlling the potential applied to the lead 492 is through resistor 601 which parallels resistor 496 with a low value of resistance when the full load dispatch relay FLD closes its contact at 316. Thus the initial portion of the dispatching interval is caused to expire very rapidly by the insertion of resistance 601 in the circuit until relay J1 pulls in to open its back contact at line 316. At that time the speed with which the dispatch timer causes its interval to expire is reduced through the opening of contact J1 by the effective increase of resistance between lead 492 and rectifier 494.

A dispatch signal is issued by the energization of relay KU as described above through the coincident operation of relay J3 and dropout of relay DFU. When a dispatch signal is issued to a car, the dispatch timer is reset through the closure of contact KU at line 320 to complete a discharge path for condenser 493 through the relatively low resistance of resistor 602 to ground. During this resetting operation the dropout of relay J3 is assured by the contacts DFUT at 320 and DFUA at 211. As noted above relay DFUT is of the slow dropout type and initiates its dropout when the load car advances to an up dispatched status. During the dropout interval no car can enter the load status. In the absence of an up load car relay DFUA is energized. Thus there is a moment when both contacts DFUT at 320 and DFUA at 321 are closed simultaneously. During this moment the relay coil J3 is short-circuited and the relay caused to drop out.

Following the reset of scheduling relay KU and the opening of contacts KU at 320, the dispatch timer again begins to time a dispatch interval. In normal operation the car initiates a starting operation through the energization of its car starting relay CS, its doors close and in due course it leaves the floor traveling upward to energize the relay BUR. This closes contact BUR at line 320 to again reset the dispatch timer interval.

When the saturated up peak condition prevails and program relay H1 has been energized the up dispatch timer 489 is effective only for the secondary bank of cars A and B, those cars serving the lower zone of landings. With the reduced number of cars available for dispatching, the dispatching interval is reduced so that the cars are sent away rapidly. This is accomplished by closing contact H1 at line 315 to short out a substantial portion of the resistance 496 in the voltage divider 496, 497, thereby rapidly charging the condenser 493 to the level causing current sufficient to pull in third up dispatch timer relay J3.

Under this program a second up dispatch timer 605 shown at the bottom of FIG. IX is rendered effective through the closure of contact H1 at line 322. This contact effectively connects a source of power to the several voltage dividers of timer 605 corresponding to those dividers in timer 489. Since the secondary dispatch timer 605 is essentially identical to those portions of the circuit 498 enclosed by the dashed line, those elements which are identical are embraced within the rectangle 606 and include the vacuum tube, voltage dividers and power supplies. This timer operates in the same fashion as timer 498 and has corresponding elements which bear the suffix E indicating that they are for the cars serving the upper zone or floors. Thus an up dispatch failure relay for the upper zone of floors is designated J0E and the first, second and third up dispatch timer relays are designated J1E, J2E and J3E. Timing condenser 493E corresponds to condenser 493 and has a discharge path through resistor 607 corresponding to resistor 602, that path being completed by the issuance of an up dispatch signal to a car serving the upper zone of landings by operation of relay KUE to close its contact at 330 and by the start of a car serving such landings through the operation of up run relay BURE to close its contact at 330. Similarly the detenting operations are performed as described for the primary dispatch timer through operation of the contacts DFUAE at 328, DFUE at 327 and J3E at 327. Full load dispatch is accomplished by operation of contacts FLDE at lines 325 and 326 and J1E at 326. Reset of the third up dispatch timing relay for the upper zone cars is accomplished by contacts DFUTE and DFUAE at 330. As with the primary up dispatch timer the upper zone up dispatch timer is arranged to measure a fixed dispatching interval and is not altered by the various integrated stop time levels since the cars should be dispatched rapidly in view of the limited service they are required to provide and the reduced number available in the dispatching group.

*Description of FIG. X*

As disclosed in the aforenoted Burgy application, Serial No. 808,290, traffic conditions are sensed by the integrated stopping time of the cars while traveling in both directions to effect certain controls and while traveling in either the up direction or the down direction for other of the controls. Only the requirements imposed upon the system for travel upward will be considered here although it is to be understood that an elevator system might also include means for sensing the requirements for down traffic or of overall traffic and for altering the control operations in accordance therewith.

Normally the system as disclosed herein operates on the up peak program wherein cars are dispatched at timed intervals from the lower dispatching landing and are reversed at their highest call. The controls for determining such operation are shown in FIG. XI and will be discussed with reference thereto. In many elevator systems the up peak operation is found to be deficient at certain very limited periods during a normal working day with the result that intending passengers are delayed for an interval greater than is desirable in being conveyed to their destinations during that period. The condition of the system during this period may be termed saturation and for convenience in identifying this condition the condition has been designated the saturated up peak state.

The requirements of ascending traffic imposed upon the system are monitored in the circuit of FIG. X as the sum of several factors including the interval the cars are stopped on their ascending trips and the number of passenger transfers which occurs during those trips. Each of these factors can be considered to build up a charge in a condenser, the stopping interval building up the charge in accordance with its length and the passenger transfers building up the charge in accordance with their number while the charge is permitted to decay with time. Alternatively the charge can be developed by only one of these factors or by a measurement of passenger transfer interval by the elimination of contacts PCT at 202 as will be understood below to apply the charging potential while a light beam in the car doorway is broken. The charge on the condenser controls the anode to cathode current in a triode connected vacuum tube and this current in turn passes through the energizing coil of the plurality of relays adjusted for different pull in currents, relay MU indicating a moderate level of up traffic at line 206, pulls in at the lowest level of effective current, relay PU, indicating a peak level of up traffic and located at line 205, pulls in at an intermediate level of current, and relay USC, indicating an up saturated condition appearing at line 204, pulls in at the highest level of current.

The ascending traffic monitor circuit 501 comprises a triode connected vacuum tube 502 which is supplied from a suitable source of alternating current through leads 503 and 504 and transformer 505. Rectifier 506 in conjunction with smoothing condenser 507 supplies the plate voltage to tube 502. The potential on control grid 508 controls the anode-cathode current in tube 502 and thus the current in the actuating coils of relays MU, PU and USC. Control grid 508 is supplied through lead 509 which is supplied from the plate supply source through a voltage divider comprising the fixed resistor 511 and resistors 512 and 513 for each of the elevator cars in the system. The rise and decay of the potential on 509 is controlled by condenser 514 connected between 509 and lead 515. Asymmetry in the charging and discharging characteristics of condenser 514 is realized where desirable by utilizing a unidirectional path as through rectifier 516 and a resistance 517 which is adjustable in the path through which the condenser 514 can be discharged and charged. Thus, in one arrangement, the potential applied to the lead 519 common to the resistors 512 and 513 can be applied directly through the rectifier 516 to the lead 509 and thus condenser 514. However, with the rectifier poled to pass current from lead 519 to 509, that rectifier opposes the flow of discharge current from the condenser 514 and that discharge must be through the parallel resistors 517 and 518 to lead 519 and from lead 519 through resistor 511 to lead 515. In this manner the condenser discharges more slowly than it is charged.

The potential on lead 519 representing the service being rendered by the cars while on their ascending trips varies with the number of cars stopped at any given instant and the passenger transfers occurring during those stops inasmuch as the insertion of several parallel resistances 512 and 513 applies a greater potential to the lead 519 than when none of those resistances are effective or when only one or a lesser number of such resistors is present. In order to insert the resistors, the car must be stopped at a floor intermediate the terminals and the contact MGF for the car must be closed at line 200. The actuating coil for relay MGF appears in line 106 in FIG. V. It is energized when the car is away from the dispatching floors so that MG and MG1 contacts are closed, the cars in group service so that contact GS is closed and the advancer motor has been deenergized indicating the car has been either stopped or in the process of stopping so that contact AMR at line 100 is closed. With the contact MGF for the car closed, the circuit is energized to the junction point 521. From those junction points either the requirements imposed and met by ascending cars or those imposed upon and met by descending cars are indicated to appropriate sensing circuits. Thus, parallel leads 522, terminated in arrowheads, are provided for controls to a sensing circuit corresponding in most respects to 501 for descending service (not shown). Cars which are ascending have their contact ULF closed and, therefore, feed the control for the circuit 501. Contact ULF, line 201, is controlled by a relay individual to each of the cars shown at lines 94 and 95 of FIG. IV. This relay is of the magnetic latch type and is energized when a car is on an up trip and reset when it has terminated the up trip. If a car is set to travel upward, its up signal relay UL is energized to close contact UL at 94 and open contact UL at 95. As the car initiates an up trip from the lower terminal, it closes its door energizing relay CL at 32 to close its contact at 94, thereby energizing the pull in coil of latch relay ULF and maintaining that relay latched until it is reset. If a car travels to the top terminal, it is reversed as described and the up signal direction relay UL is deenergized to open contact UL at 94 and close contact UL at 95. Upon initiation of departure of the car from the top terminal, the doors are closed and contact CL at 94 is closed to energize the reset coil of relay ULF dropping the relay out. Relay ULF is also reset when a car stops for a high call reversal operation. Slowdown for a high call reversal is initiated by the pull in of relay SD shown at line 82 to close contact SD at 95. At this time the direction of travel of the car is also reset and relay UL is deenergized. Thus a reset circuit is established for relay ULF as the car slows for a high call reversal through the contacts UL and SD at line 95.

When a car on an up trip, as defined during the operation of relay ULF, is stopped at a floor intermediate the terminals, as defined by the operation of its relay MGF, current flows through the resistor 512 to lead 519 and charges condenser 514, raising the grid potential 508 and increasing the anode-cathode current in tube 502. Stopping of several cars simultaneously further increases that current and the rate of charging of the condenser.

The charging of condenser 514 is also supplemented by the transfer of passengers between the landing at which the car is stopped and the car. As a passenger crosses the threshold of the car and breaks the light beam impinging upon a photocell at the threshold, the contact PCC at line 26 opens to deenergize photocell relay PC. Up to this moment contact PC at line 23 is closed to energize photocell auxiliary relay PCT1 which opens its contact at line 203 and closes its contact at line 25 to energize photocell timer PCT. PCT1 and PCT are of the slow dropout type. After PC drops to open contact PC at 23, PCT1 drops with a delay sufficient to avoid false passenger transfer counts. Contact PCT1 at 25 opens to deenergize PCT. At this time back contact PCT1 at 203 is closed but PCT at 202 has not yet dropped, hence a charging path is completed through resistor 513 for the dropout interval of relay PCT. This inserts a given amount of additional charge in the condenser 514 for each passenger transfer.

*Description of FIG. XI*

The program relays and program selection relays of the system are shown in FIG. XI. The system is arranged for either automatic or manual selection of programs and is provided with a manual program selection switch 531 having a contact arm 532 which can be engaged with a semi-circular array of contacts associated with the several programming relays. Thus contact 533 is engaged by arm 532 to set up automatic programming wherein the program relays H1, H2, H3 and H4 are controlled by the operation of program selection relays shown in the lower portion of the figure. When arm 532 engages contact 534, no program relay is energized and the system operates on the up peak mode. When contact arm 532 engages contact 535 program relay H2 is energized to set the system for off peak or balanced operation. Engagement of contact 536 by arm 532 energizes relay H3 to set up the down peak operation and engagement of arm 532 with contact 537 energizes relay H4 to set up the off hours mode of operation.

A motor driven throwover relay H13 is shown at line 215. This relay institutes zoning and is responsive to the energization of saturated up peak program relay H1 or down peak program relay H3 closing contacts at 216 or 217 to cause the relay to throwover to the zone position wherein its limit contacts H13 at 216 are open and H13 at 215 are closed. Upon the dropout of both the saturated up peak program relay and the down peak program relays to close back contacts H3 and H1 in series at 215 the H13 relay returns to its normal position wherein zoning is no longer effective.

First program selection relay PS1A at 218 sets up the saturated up peak program by closing its contact at 211 to energize relay H1 when the system is on automatic operation. With the switch 538 open, relay PS1A is energized when the saturated up peak traffic condition prevails and relay USC at line 204 of FIG. X is energized to close its contact at line 218. The PS1A relay remains energized only during the interval that relay USC holds its contact at 218 closed unless a holding circuit is established through the contacts MU and PS1 at line 219. MU necessarily will be closed when USC is closed inasmuch as the energizing coil of that relay is in series with the coil for relay USC and pulls in at a lower current. Program selection relay PS1 is controlled by a clock, not shown, and is closed during certain intervals of the day which can be selected as those during which the up peak condition is anticipated, as for example, from 8:45 to 9:00 in the morning and from 12:45 to 1:00 in the afternoon. Thus, once PS1A is energized during one of those clock controlled periods the saturated up peak condition will be maintained in the system controls until the end of the up peak period so long as a moderate amount of up service is required of the system. If the service drops off to the point that relay MU is deenergized, however, relay PS1A drops out and the H1 program relay is deenergized to release the system from the saturated up peak control.

If the switch 538 is closed, a pull in circuit is established and the program selection relay PS1A can be energized during the clock controlled interval which closes program selection relay contact PS1 at 219 when a moderate amount of up service is required of the system and contact MU at 219 is closed. With switch 538 closed the dropout of relay PS1A remains dependent upon the clock control and the moderate up service relay.

Third program selection relay PS3A at line 220 sets up the down peak program when the program selection switch is set on automatic by closing contact PS3A at line 213. This relay is pulled in when peak down traffic is sensed to energize a PD relay (not shown) and close its contacts at lines 221. The program selection relay PS3A remains energized subject to a clock control (not shown) through clock controlled program selection relay PS3, a contact of which appears at line 220 in the seal circuit for PS3A. This clock control contact can be arranged to be closed when peaks in down traffic are anticipated as at the end of the morning and afternoon work periods, for example, from 12:00 to 12:15 and from 4:45 to 5:00 in the afternoon. Relay PS3A also prevents the energization of either the off hours or off peak programs by opening its back contact at line 222.

Off peak program selection relay PS2 at line 222 is energized if neither the saturated up peak nor down peak programs are in effect so that back contacts PS1A and PS3A, respectively, remain closed at line 222 and if an up peak traffic requirement is not imposed on the system to energize up peak relay PU and open its contact at line 222 provided all of the cars which are in group service are operating to energize balanced service relay ECA (not shown) and close its contact at line 222. Even if certain of the cars are shut down, off peak program selection relay PS2 remains energized for an interval determined by the timing interval of timer PS2T at 223. PS2 seals itself in through back contact PS2T and its front contact PS2 at line 223. PS2T begins to time upon the dropout of balance service relay ECA since its energizing circuit is closed by the closure of back contact ECA in line 223. PS2T is of the slow pull in type. Upon the completion of its pull in cycle it opens its contact at line 223 to deenergize PS2 and open its holding circuit, whereby the back contact PS2 at 224 closes. In view of the deenergized state of the relay ECA and the closed ECA contact at 224, off hours program selection relay PS4 is energized by closure of contact PS2. PS4 closes its contact at line 214 to energize the off hours relay H4 when the system is set on the automatic program selection.

*Description of FIG. XII*

The up service provided by the elevator system in the upper and lower zone of landings is monitored in the circuit of FIG. XII. These monitors can be used to control program selection for the saturated up peak condition alone or in conjunction with the up service monitor circuit 501 of FIG. X. Each of the service monitors corresponds generally to the circuit shown in FIG. X, the rectangles 541 and 542 representing the circuit elements enclosed within the dash line perimeter of FIG. X including the triode, its power supply and the several resistances of the voltage divider, together with the equivalent of the rectifier 516 and the equivalent of the condenser 514. The circuit 541 monitors up service rendered in the upper zone of floors and in response to a moderate level of such service causes upper moderate up service relay MUE to be energized at 235. In series with that relay is the upper up peak service relay PUE at 234. These two relays are in the anode-cathode circuit of the triode connected vacuum tube in the circuit 541 and are energized when the potential on the control grid of that tube is raised to appropriate critical levels. Such potential control is attained through the contacts ULF operating in the manner of contacts ULF described for FIG. X when the car is on an up trip and not at one of the dispatching terminals and through the closed contacts MGFE which are operated when the car is stopped or set to stop at a landing in the upper zone of floors. Operation of MGFE was described with FIG. V where that relay appears at line 107. It is subject to control by the express zone relay EZ so that it can be actuated while the car is in the express zone through the contacts MG, MG1, GS and AMR. Thus when the car is stopped at a landing in an upper zone of floors, the charge on the timing condenser of circuit 541 is built up in the manner the charge on condenser 514 is built up for the monitor 501. Also as described for the monitor 501, load transfers in the express zone cause the simultaneous closure of the contacts PCT and PCT1 at 233 and 234 for the car for a given interval, thereby adding a predetermined quantity of charge for each transfer while the car is serving the upper zone of landings.

Rectangle 542 contains circuitry corresponding to that in rectangle 541, the charging path for these circuits is established through the ULF contacts for the upper zone circuit and contacts MGFL of lower zone stopping relays, the operation of which was described with respect to FIG. V and the operating coils of which appear at line 108. Charging potential is applied to the circuit 542 during the interval any car is stopped at a landing in the lower zone through the combined closed contacts ULF at 231 and MGFL at 236 of that car. The circuit for car A is shown complete and those for cars B, C and D broken at the arrow-headed leads which are connected together in practice. Further, while this stop occurs, any load transfer also applies a charging potential to the circuit through the contacts ULF, MGFL and the simultaneous closure of contacts PCT and PCT1 at 237 and 238 of the car for a given interval representing each load transfer operation. Lower moderate up service relay MUL and lower peak up service relay PUL are connected in series in the anode-cathode circuit of the vacuum tube in 542. The pull in point for relay MUL is adjusted at some level representative of a moderate amount of up service rendered in the lower zone of floors and that for relay PUL at some higher level representative of a peak level of up service in the lower zone of floors.

With the equipment of FIG. XII, combinations of ascending service can be monitored. Thus, the system might be rendering moderate up service in one or both zones, peak up service in one or both zones or a combination of peak up service in one zone and moderate up service in the other. In each instance a combination of operated relays MUE, PUE, MUL and PUL would indicate such a condition to the program selection relays.

*Description of FIG. XIII*

FIG. XIII shows several alternative circuits for controlling the operation of program selection relay PS1A as depicted at line 218 of FIG. XI whereby the saturated up peak program controls can be placed in operation. A saturated up peak program selection timer PS1T is also employed. In this circuit selection of the saturated up peak condition is responsive not only to the service monitor for the entire group of landings of FIG. X but also to the individual up service monitors of the upper and lower zones of FIG. XII. Program selection relay PS1A at 242 can be energized by the closure of contact USC at 241 of the up saturated condition relay and it is also responsive to a combination of an up peak condition in one zone and a moderate up service condition in the other as by an up peak condition in the upper zone to pull in contact PUE and moderate up condition in the lower zone to pull in contact MUL at lines 246 or an up peak service condition in the lower zone and a moderate up service condition in the upper zone to close contacts PUL and MUE at line 245. Any of these conditions will, of course, retain the program selection relay PS1A energized so long as they prevail. However, even in the absence of one of these conditions once the relay is pulled in it will be maintained energized through a seal circuit established through contact PS1A at 242. With the switch 551 closed the seal is established by a moderate level of up service in either the lower or upper zones to close contact MUL at 244 or MUE at 243. This seal circuit can be effectively eliminated by the opening of switch 551. With switch 552 closed the seal is maintained by a moderate level of up service over the entire system to close contact MU at line 242.

With switch 552 opened the seal for relay PS1A is retained for a given interval following the termination of the up saturated condition in the overall system. Upon the termination of that condition, back contact USC at line 243 is closed to energize the timer PS1T. PS1T begins to measure an interval. If the absence of the saturated up peak condition maintains throughout the interval measured by the timer PS1T, upon the termination of that interval contact PS1T at line 242 is opened. This breaks the holding circuit for PS1A even though a moderate amount of up service is being provided over the entire system and contact MU is closed. Further, if the service diminishes from a moderate up level during the timing out interval of PS1T, the seal circuit to PS1A is broken by the opening of contact MU at 242. Thus, it is seen that in the alternative control for saturated up peak program selection relay PS1A of FIG. XIII the relay is responsive to an up saturated condition of the overall system, and an up peak service condition in one zone of landings and a moderatae up condition of service in the other zone of landings. The relay PS1A is retained energized in this alternative despite the absence of the initiating condition by a moderate level of service in either zone if switch 551 is closed, by a moderate level of service over the entire system if the switch 552 is closed, and if the switches 551 and 552 are both opened, for a given interval following the reduction of up service from the up peak saturated condition provided a moderate amount of up service over the entire system is being rendered.

*Description of FIG. XIV*

In the system outlined above, several dispatch timers for the entire bank of cars and for the split bank of cars were shown. Thus, dispatch timer circuit 489 served as a primary timer for the entire bank when the system was operating under the conventional forms of programs and when the system was split to two secondary banks which were zoned for saturated up peak service the dispatcher 489 was utilized as a secondary timer for one bank serving one portion of the group of landings and a second secondary dispatch timer 506 was utilized for the second bank. When a saturated up peak condition prevails, the cars are not dispatched from the top dispatching terminal. Accordingly, if the system is provided with top terminal timed dispatching, the equipment utilized for such dispatching can be modified to a secondary up dispatcher to control up dispatching of one of the two split banks. The modifications shown in FIGS. XIV, XV and XVI are arranged to accommodate this type of equipment.

A top terminal dispatch timer corresponds generally to the dispatch timer of circuit 489. Such a timer is shown in detail in the aforenoted Burgy application Serial No. 808,290. The differences in such a timer reside in its response to top terminal control relays instead of bottom terminal control relays. Those relays are shown in FIG. XIV. Upper dispatch terminal relay MG1, together with its auxiliary relay MG1X at 252, are energized when the car is at the top terminal under ordinary circumstances. As the car leaves the top terminal and is traveling downward it actuates down run relay BDR at 254. These relays generally correspond in structure and function to the lower dispatch terminal relays MG at 257 and its auxiliary MGX at 256 and to the up run relay BUR at 255. All relays of this group are operated off a single lane of floor selector segments by engagement of individual segments by brush 561 which is carried on the crosshead 415. Brush 561 is shown in engagement with floor selector contact 562 for the top terminal of the elevator system. Top terminal dispatching is effective only on the off peak or balanced program; hence, this engagement is effective only when off peak program relay contact H2 is closed at line 253. When closed and when the car is in group service, relay contact GS at 253 is closed, relay MG1 is energized to indicate that the car is positioned at the top dispatching terminal. Auxiliary top dispatch terminal relay MG1X is also energized at this time and remains energized until a down dispatch signal has been issued to the car and its down dispatch relay (not shown) opens its back contacts CDD at line 252. The dropout of relay MG1X permits another car to be advanced through the selection sequence and conditioned for dispatching downward. Upon departure of the car from the top terminal running downward, the brush 561 is carried into engagement with segment 563 to energize down run relay BDR at 254 through closed saturated down peak program relay contact H1, provided the car has its down generator field relay energized to close contact DF at 254. Relay BUR at line 255 corresponds to BUR at line 111 with the exception of the presence of the normally closed H1 saturated up peak program relay contact at 256 for cars serving the upper zone.

When the car is at the lower terminal and brush 561 is in engagement with segment 565, the relays MG and MGX are energized at 257 and 256, respectively. Upon the issuance of a dispatch signal contact CUD at 256 opens to drop out relay MGX. When on the saturated up peak program back contact H1 at 257 for cars serving the upper zone is open to disable the lower dispatch terminal relays MG and MGX and contact H1 at 258 is closed to connect the floor selector segments 565 for those cars at the lower dispatching floor to the upper dispatch terminal relays MG1 and MGX. Thus while the system is operating on the saturated up peak program and the upper zone cars are at the lower floor, their MG1 and MG1X relays are energized in place of their MG and MGX relays. This actuates the down dispatching circuits, indicating that the car is at the dispatching terminal, and those circuits operate as they normally operate for down dispatching. Similarly as the car runs up from the lower dispatching terminal and brush 561 engages segment 564, down run relay BDR is energized to reset the down dispatch timer and initiate another down dispatching operation. This is effected by the opening of back contact H1 at 256 to disconnect up run relay BUR from segment 564 and by closing of front contact H1 at 255 so that an up running car having its up generator field relay UF energized closes contact UF at 255 and completes a circuit to down run relay BDR. At this time, down run relay BDR is rendered nonresponsive to a car running downward from the upper terminal by the opening of contact H1 at 254. Since on the saturated up peak program the off peak relay H2 is deenergized, upper dispatch terminal relays MG1 and MG1X are isolated from floor selector segment 562 by open contact H2 at 253.

Down dispatch holding relays DFDA at 259 and DFD at 260 function in a manner similar to the up dispatch holding relays DFUA and DFU at 180 and 182, respectively. Thus, when no car is in the down load status, down selection control relay RD is deenergized as will be shown in FIG. XVI and the back contacts RD at 258 and 259 are closed so that upon the timing of the top terminal dispatch timer to the detent position pulling in the second dispatch timing relay K2, relay DFDA is energized if no load car is available for dispatching by the dispatcher. Similarly, if the top terminal dispatch timer fails, failure relay K0 will drop out to close its back contact at 260 and establish the detenting operation. Relay DFD is energized and after K2 has been pulled in during the dispatching cycle so long as no car is available to enter the load status as indicated by the closure of contact DFDA at line 262 or if no call is in registration which can be answered by a car in the down load status as indicated by the energized hall call relay SSA and closed SSA contact at line 260, and the completed circuit through the parallel down load relay contacts CDL for the several cars and their individually paralleled car call below relay contacts CBD, it will be noted that the down dispatch holding relays are effective when the down dispatcher is used for dispatching cars C and D upward on the saturated up peak program and under such conditions, car calls above the car must be effective to release relay DFD. Such car calls are effective by virtue of the normally closed car call above relay contacts CB for cars C and D in series with contacts CBD for those cars and paralleling contacts CDL for those cars at line 261. Thus, when the car is to be dispatched from the lower terminal by the up dispatch timer, the registration of the car call above opens the energizing circuit for relay DFD and drops it out.

*Description of FIG. XV*

The circuits controlling the indicators for a system wherein a top terminal dispatcher is utilized to dispatch cars from the lower terminal during the saturated up peak condition is shown in FIG. XV. When the top terminal dispatcher is effective to dispatch cars downward, the down indicator lamp 566 at 271 is illuminated for the car when it is set for loading prior to down dispatching through the operation of its down load relay CDL and the closure of contact CDL at 271. When on the saturated up peak program, indicator 566 is disabled by the opening of back contact H1 at 271 and the down load relay, which under this program is utilized as an up load relay, is effective to energize the "This Car Up" sign at 275 for the car through closed contact H1 at line 273. Typical hall lanterns, L13U and L2U, are also shown. Those hall lanterns are actuated off floor selector segments 473 as discussed for FIG. V through operation of a brush 474 on the crosshead. The circuit energizing this brush corresponds to that in FIG. V in line 100 and includes the direction throwover relay RL which has its contact closed when the car is set to ascend, a bypass relay contact BP closed except when the car is set to bypass, a car start relay contact CS closed until the car is started and maintained open while the car is running and an advance motor relay contact AMR which is closed while the advance motor is running and thus while the car is running and until it is set to stop. Portions of this circuit also control "This Car Up" and "This Car Next" signs. Thus, on other than the saturated up peak operation, the "This Car Up" sign for each car is actuated through the operation of lower dispatch terminal relay MG to close its contact at 275 and up load relay CUL in series therewith such that the "This Car Up" sign is illuminated when the car is assigned the up load status, is present at the lower dispatching terminal, and has not yet received a car starting signal.

On the saturated up peak program, intense demand is imposed upon the system by passengers entering the building at the lower dispatching floors. The result in the loading area tends to lead to confusion among prospective passengers. In order to alleviate this confusion at that time the system is provided with indicator lamps in the lobby adjacent each car indicating the conditioning of that car as the next to be sent upward following the current load car. Thus when the load car is nearly full, prospective passengers can initiate the loading of the next car to enter the load status even before it is thus assigned. "This Car Next" signs are illustrated for those cars serving the lower bank of floors and controlled by the normal lower terminal dispatching system and for those serving the upper group of floors and controlled by the upper terminal dispatching system. Each lamp is activated when its H1 contact is closed indicating the system is operating on a saturated up peak program as shown at 276 for the car serving the lower group and 277 for the car serving the upper group. When the low zone car is conditioned as next to enter the up load status, its CUN relay is energized as described above to close contact CUN at 276 and illuminate "This Car Next" sign 577. Similarly, when the upper zone car is conditioned to be assigned the load status next, this car next relay is energized to close contact CDN at line 277 and energize its "This Car Next" sign 578.

Up and down indicator lamps are provided within each car as represented at 278 and 279. The up lamp is ordinarily illuminated as an up dispatch signal is issued through the closure of contact CUD at 278 and the down lamp is illuminated by a down dispatching signal through the closure of contact CDD at 279. When the upper zone cars are dispatched from the lower terminal under control of the dispatching equipment normally employed at the upper terminal, operation of contact CDD at 279 is effective to illuminate the up lamp in the car through the closing of contact H1 at 278 and the opening of contact H1 at 279.

It will be seen that a substantial saving in equipment can be effected by the above techniques wherein the signals for the split bank of cars normally function for single bank operation in response to a dispatcher at the lower terminal controlling all the cars and a dispatcher at the upper terminal also controlling all the cars. When the saturated up peak condition prevails and it becomes necessary to split the bank of cars into the high rise serving bank and a low rise serving bank, the lower terminal signals are rendered responsive to the dispatcher previously used for controlling dispatching of the cars from the upper terminal. The down dispatcher then becomes a secondary up dispatcher which selects and dispatches cars serving the high zone and activates the "This Car Next" sign and load car sign at the lower terminal. Advantageously zone signs as described for FIG. IV can be employed with this embodiment.

*Description of FIG. XVI*

The dispatching circuits for controlling the top terminal dispatching for a four-car bank of cars is shown in FIG. XVI, together with the modifications which enable that dispatcher to be utilized in controlling the departure of the high rise bank of cars from the lower dispatching floor when the bank is split. Throughout the description of this figure the terms applied to the elements will be associated with the down dispatcher. However, it is to be understood that under the present mode of operation, many of these elements function both up and down dispatching operations.

Presence of a car at the top dispatching terminal on the balanced program or the bottom dispatching on the saturated up peak program energizes its relays MG1 and MG1X at 252 and 253. This closes an MG1X contact at 281 through 284 to actuate down rotary dispatch selector RSD provided no other car has been selected to be sent away from the dispatching floor as indicated by the energization of down selection control relay RD at 285 to open its back contacts at 281 and 282. Relay RD is energized by the presence of any of the cars in the down next status through the closure of one of the down next relay contacts CDN at 282 through 285.

Down load control relay DFDL and down load control timer DFDT at 286 and 289, respectively, correspond in their functions to the up load control relay and timer described with respect to FIG. VII. They are energized by the assignment of a car to the load status through closure of one of the down load relay contacts CDL at lines 286 through 289. Timer DFDT has a slow dropout characteristic and functions in the resetting of the down scheduling relay KD (not shown) but corresponding to KU at line 192 such that the release of a car from the down load status and the dropping of its relay CDL permits a contact of DFDL to close immediately while a normally open contact DFDT is retained closed momentarily until the resetting circuit of KD has completed the resetting function and, relay K3 (not shown) of the down dispatch timer has been reset as J3 is reset by DFUL and DFUT. Thereafter, the armature of DFDT drops to open the reset circuit and close back contacts at lines 297 and 299 to permit another car to advance into the down load status by energizing its relay CDL.

Control of the "This Car Next" lantern for those cars assigned to serve the upper zone of floors is afforded by down next selection relays CDN individual to the cars shown at 290 through 293. These relays can be energized only when the car with which they are associated is available at the dispatching floor to close its MG1X contact and the down rotary selector RSD has closed the contact for that car at lines 290 through 293. When CDN is energized it closes a contact at line 277 as described to light the "This Car Next" sign for those cars serving the upper zone of floors and prepares the down load relays CDL at lines 295 through 301 for energization through the closure of contacts CDN at 295, 297, 299 or 301 in series with the DFDT contacts. Thus, on balanced operation when cars are dispatched from the top terminal, relays CDN determine the car to be sent away from the terminal and in the case where there are no landings above the terminal the next car which is to be sent downward by advancement through the down load status.

Down load relays CDL, when energized through the selection process, seal themselves in through holding contacts at 294, 296, 298 and 300. They actuate the down load light by closing their contact at 271 and they prepare a circuit which, on the balanced program, energizes the down dispatch relay CDD of the car when the down scheduling relay closes its contact KD at line 304. For example, when car A is advanced to the down load status through the energization of relay CDL(A) to close contact CDL(A) at line 302, relay CDD(A) is energized through MG1(A) at 302, CDL(A) at 302 and KD at 304, when KD is energized by the down dispatch timer (not shown). CDD(A) then establishes a holding circuit by closing its contact at 301 and opens its contact at 252 to deenergize relay MG1X. This releases the down load relay CDL(A), thereby deenergizing relay DFDL and timer DFDT to reset the down schedule relay KD and permit another car to advance into the down load status.

Assuming another car had been available at the dispatching landing and had closed its MG1X contact, it would be selected for down next operation as the preceding car entered the load status and opened its CDL contact at lines 290 to 293. This would open the CDN contact of the preceding car at 282 to 285 and down selection control relay RD would thereby be deenergized to enable the down rotary selector RSD to select the following car.

When the saturated up peak condition is effective those cars which are arranged to serve the upper zone of floors actuate the down dispatching circuits upon their arrival at the lower dispatching floor through the operation of the relays shown in FIG. XIV. Assuming that cars C and D are selected as those which will serve the upper floors on the saturated up peak program, their relays MG1, MG1X, CDN, CDL and CDD will operate to cause operation of relays DFD, DFDA, BUR, RSD, RD, DFDL and DFDT common to the group. A down dispatch timer corresponding to those described above for up dispatch timing as in FIG. IX will control KD under the circumstances to issue dispatching signals at intervals. Cars C and D, therefore, are issued dispatch signals subject to the operation of down scheduling relay KD through its contact at 304 when they are at the lower dispatching floor and the system is operating to meet the saturated up peak condition. Further, on saturated up peak operation the cars can be dispatched from the lower dispatching terminal when they are loaded to a predetermined level by operating their CDD relays through closed H1 contacts at lines 307 and 310 and respective load weighing switch contacts LW(C) and LW(D) in series therewith. It should be noted that the only other condition imposed on load dispatching is that the cars be present at the lower dispatching floor so that contacts MG1(C) and MG1(D) are closed. Thus a car can be load dispatched even though it is not assigned as the next to be dispatched or to the load status in accordance with this form of saturated up peak operation.

*Operation*

In considering the operation of the system assume that the program control is set for automatic operation with switch arm 532 on contact 533 and the up service conditions, as measured by the combination of stop time of all the cars in the system and the passenger transfers while the cars are on up trips, gradually increase. The first embodiment employing the service condition computer of FIG. X and the program selector of FIG. XI will respond in several ways depending upon the time of day and the position of switch 538 at 218. At times when the clock controlled program selector switches are ineffective the saturated up peak program will be introduced only when the up service conditions are sufficient to energize USC at 204 to energize PS1A at 218 and H1 at 211. No seal circuit is available for PS1A and the program terminates out as soon as up service conditions diminish to drop USC. If the clock controlled contact PS1 at 219 is closed while PS1A is energized a seal circuit is provided through contacts MU, PS1, and PS1A at 219 which is maintained despite the dropping of USC provided a moderate up service condition exists to energize MU at 206.

Alternatively, the program control of FIG. XI can establish the saturated up peak program through a combination of a clock control and a moderate up service condition if switch 538 is closed. This circuit is completed at 219 through contacts PU and PS1, and switch 538.

A second embodiment of a program selection circuit for setting up the saturated up peak program is shown in FIG. XIII. With this circuit substituted for that of PS1A in FIG. XI a number of conditions will institute and hold the saturated up peak program. When the computer measures a high level of up service and energizes USC, PS1A is energized by closed contact USC at 241 and timer PS1T is reset by opened contact USC at 243. The reduction of up service to a level where USC is deenergized but MU remains energized insures that the up saturated condition will be retained for a given interval after USC drops. Timer PS1T controls a hold circuit for PS1A by timing out in response to closure of contact USC at 243. Until timed out, contact PS1T at 242 holds PS1A through closed contacts MU and PS1A. If desired, the drop of PS1A can be prevented until the up service diminishes to below the moderate level to drop MU by closing switch 552 to shunt the timer contact PS1T so that only contacts MU and PS1A are effective in this hold circuit.

In the second embodiment the up service condition computers for the cars zoned to serve the upper and lower zones of landings are also effective. These computers appear in FIG. XII. They provide circuits for both instituting and sustaining the saturated up peak program. With switch 551 open the seal or sustaining circuits are disabled and the only seal circuit is that at 242 subject to the moderate up traffic condition as described. Institution of the program is by a combination of a peak up traffic condition in one zone and at least a moderate up traffic condition in the other zone to close one of the circuits at 245 and 246. A peak in the lower zone closes contact PUL and a moderate level in upper zone closes contact MUE to energize PS1A. A peak in the upper zone closes contact PUE and a moderate level in the lower zone closes contact MUL. While the up service condition levels for the system as a whole and the individual zones can be adjusted to the needs of the system such as the population density on the several floors served, the number of cars serving the floors, the requirements for service to the floors during the saturated up peak, and the number of landings in a zone, it is advantageous to set those levels such that for balanced service between the zones the moderate up service relays of the overall system and the individual zones pull in together and the peak service relays of the overall system and the individual zones pull in together. When so adjusted the saturated up peak service relay USC will be effective to institute the program only when a high intensity of up service is concentrated in a zone while less than moderate up service is rendered to the other zone.

The seal circuits available when switch 551 is closed hold the saturated up peak program until the up service in each zone has diminished below the moderate level and contacts MUE at 243 for the upper zone and MUL at 244 for the lower zone are both open.

Operation of saturated up peak program relay performs a substantial number of changes in the system. In each embodiment the bank is split into two secondary banks or more if a sufficient number of elevators are available and the landings are divided into two or more zones wherein each secondary bank of cars is dispatched to its zone.

Zoning is effected through zoned program relay H13 at 215 which is energized for both down peak zoning and saturated up peak zoning. When relay H1 is energized it closes its contact at 216 to energize the motor of H13. H13 runs until it reaches the thrown over position wherein all of its contacts are reversed from the position shown and back contact H13 at 216 is opened. The switch is conditioned to be reset by closing contact H13 at 215 and is reset when neither the down peak nor the saturated up peak is effective and contacts H3 and H1 at 215 are both closed. Upper and lower zone relays ELE and ELL are enabled by closure of contact H1 at 110 and H13 at 109 to assign the cars to their respective zones when all of their then current car calls have been answered, as by the travel of the car to or beyond all registered car calls, and car call above contacts CB and car call below contacts CBD at 109 and 110 are closed. In the present example cars A and B are assigned to the low zone of landings and cars C and D are asigned to the high zone of landings. An H13 contact at 87 is opened to separate the series of normally closed landing call contacts for the intermediate landings in the lower zone from those contacts for the remaining landings. Contacts of H13 are closed around each up landing call contact in the lower zone as illustrated at 90 for the second landing and at 88 for the fifth landing. An H13 contact at 87 connects the separated contacts to power lead GN thereby rendering relay SS and the high call reversal circuits for cars A and B responsive to down landing calls in the lower zone.

High call reversal circuits for cars serving the upper zone are rendered ineffective while those cars are in the lower zone by opening back contact H13 at 88 between brush 472(C) and highest call relay HCT(C). This relay can be energized only after the car enters the upper zone and contact MGE at 87 is closed.

During zoning high zone car calls are not latched in in the low zone cars since, as seen in FIG. III back contact H1 at 62 and contact ELL at 63 are open to bar energization for holding coils 445 after the car button is released. These cars serve car calls in the lower zone.

Car calls for a high zone landing held registered in a low zone car cannot force the car to enter the upper zone during zoning since the car call circuits are opened by back contact ELL at 38.

Relay HCT when energized by the absence of a car call above and landing calls above institutes high call reversal through high call relay HC and high call reversal relay HCR (not shown), HCT(A) is connected directly to lead GN through contacts MGE and ELL at 86 when the car reaches the top of the low zone thereby instituting the reversal of that car despite the open landing call contacts in the upper zone.

The low and high zone cars each are capable of high call reversing in their zones by virtue of the operation of relays HCT. Low zone cars reverse when HCT(A) is energized by contact of brush 472(A) with a floor selector segment 469(A) which is connected to lead GN through the closed contacts above it. This energization during zoned operation is effected through contact ELL at 86 and closed back contact MGE at 85 to brush 472(A). That circuit is completed until the car reaches the top of the low zone and MGE is energized to connect HCT(A) directly to lead GN. During down peak zoned operation relay ELL is inoperative so contact ELL at 85 is closed and back contact H3 at 85 is open; hence, the only means of completing the HCT(A) circuit to brush 472(A) is through contact MGE at 84. Accordingly, in this operating mode car A high call reserves only when at or above the top of the local zone. MGE remains energized throughout operation of a car in the upper zone since it latches in as described for FIG. I. Upon travel of the car to the landing of the highest car call, relay CB drops and the highest call relay HCT is energized to cause car reversal if no landing calls remain requiring travel upward.

Service to up landing calls by ascending low zone cars A and B is prevented by opening switch 462 at 74 and back contact ELL at 73 between up landing signal brush 456 and landing call stopping relay S. Descending low zone cars serve all down landing calls even though back contact H13 is opened at 75 to break the direct path from relay S to down landing signal brush 458 since switch 465 is closed for low zone cars and closed contact ELL at 75 offers an alternative circuit.

Upper zone cars retain no car calls for the lower zone since the holding coils 445 for those car buttons are opened in FIG. II at back contact ELE at 51. These cars do serve car calls in the upper zone. In order to prevent service to the low zone by imposing constant pressure on the car buttons of the upper zone cars their car button stopping circuits are opened through back contacts as illustrated at 39, 41 and 42.

Upper zone cars serve all up landing calls since their up landing call stopping brushes 456 are connected through either contact ELL at 73 or closed switch 462 at 74 and contact UF to stopping relays S. Descending upper zone cars serve down calls in the upper zone only during the saturated up peak program since contacts H13 and ELL at 75 are opened between down landing calls stopping brush 458 and stopping relay S. Connection between that brush and relay S is made through zoned down landing call stopping brush 468 which engages serially connected floor selector segments for the upper zone. When the car is in the lower zone as illustrated, the connection is not made on the saturated up peak program since relay BPL (not shown) is inoperative and its open contact at 81 isolates the serially connected segments for landings 2 to 6 from brush 458.

High call reversal of an upper zone car can be accomplished only at or above the top of the lower zone since zoning program relay contact H13 at 88 is opened to separate high call brush 472(C) from highest call relay HCT(C) as is upper zone indication relay contact MGE at 87 until the car reaches the top of the lower zone. Thereafter contact MGE is closed and in the absence of an up landing call at 6 to open S6U at 85, an up or down landing call above, or a car call relay HCT(C) will be energized and institute a reversal.

Each of the banks of cars split from the primary bank is independently dispatched by equipment placed in operation by the saturated up peak program relay. In the first and second embodiments a second up dispatch timer is placed in operation by closing contact H1 at 212. This timer has a relatively fixed interval since it controls the dispatch of only the high zone cars, cars C and D, and therefore, it is not provided with service condition controls of the type monitoring stop time and passenger transfer as is done through contacts DS0, DS1, DS2 and DS3 of the primary up dispatch timer. The primary up dispatch timer is also modified on this program to eliminate those control factors by closure of contact H1 at 204 since it now will control the low zone cars, cars A and B, as a secondary timer.

Low zone indicators for cars A and B and high zone indicators for cars C and D are activated by closure of contact H1 at 105 in the circuit of the zone sign of each car. When a car is stopped at the main terminal, its MG contact at 105 and AMR contact at 100 are closed to complete the circuit for the zone sign.

In dispatching the zoned cars dispatch indicators individual thereto are also operated to signify the loading car and the next loading car for each bank. Contact H1 at 104 closes on the saturated up peak program to activate "This Car Next" indicators for the several cars. Each of these indicators operate for its car through closed contacts CUN at 104 and AMR at 100, when the car is selected for departure.

Down peak zoning provides no up service by low zone cars, hence the "This Car Up" indicator for those cars is disabled by opening contact ELL at 103. However, on saturated up peak operation the indicators of both the low and high zone cars are rendered effective through contact H1 at 102 when the car is in the up load status through contacts CUL at 103 and CS and AMR at 100.

The split banks are controlled in part by altered primary bank dispatching circuits and in part by additional circuits. The car available relays CA and lower dispatch terminal relays MG and MGX function the same for either operation. The lower terminal selection relays CUN are split into an upper zone group and a lower zone group by H1 contacts at 145 and 148 as are the up load relays CUL by H1 contacts at 136 and 137 and the up dispatch relays CUD by H1 contacts at 126 and 127.

Circuits are added for many of the dispatching functions so that the primary relays and timers operate in the dispatching of the low zone bank of cars and supplemental or secondary relays and timers bearing a suffix "E" are added for the high zone bank. High zone car departure from the lower terminal has no effect on BUR at 111 since contact H1 at 112 is open. However, a supplemental up run relay BURE at 113 is inserted by closed contact H1 at 113 connecting segment 478(C) thereto. Similar limiting connections and additions are effected in the circuits of FIGS. VII and VIII on the saturated up peak program to the full load dispatch relay by contacts H1 at 152 and 154, to the up load car control relay CULX by contacts H1 at 158 and 159, to up load control timer DFUT and up load control relay DFUL by contacts H1 at 162 and 163, to the lower rotary car selector RSU by contacts H1 at 166 and 167, to the lower selection control RU by contacts H1 at 170 and 171 and to the up dispatch timer holding relays DFU and DFUA by contacts H1 at 182, 183 and 184. No modification of the up scheduling relay KU is required on this program since only cars A and B can affect its controlling contacts. A second up scheduling relay KUE for the upper zone dispatching is activated by closure of contacts H1 at 188 and is controlled by the contacts of the added upper zone dispatching relays.

A dispatching sequence for the saturated up peak program in general follows the primary dispatching. Arrival of either car A or B at the first landing energizes MG and MGX to activate the circuits for the car available relay CA, lower terminal selection relay CUN, up load relay CUL and up dispatch relay CUD for the car. Relay CA partially enables lower rotary car selector RSU. If no car is selected the CUN relays for the bank are out and lower selection control RU is deenergized to complete energization of RSU. RSU hunts by successively closing its contacts for the cars, only the contacts for cars A and B being effective at this time. When the RSU contact of the available car closes, its CUN relay is energized to energize RU and terminate hunting by RSU. If up load control timer DFUT is timed out, CUN energizes up load relay CUL to place the car in up load status and deenergize CUN. If timer DFUT is not out, as where another car is in up load status, CUN is maintained energized and the car is indicated as the next up car. When up scheduling relay KU is latched in by timer relay J3, the up load car's CUD relay is energized to issue a dispatch signal to that car, remove it from up load status and permit another car to enter up load status.

A dispatch signal will be issued by operation of relay J3 only if a call is registered which can be answered by the load car. Low zone cars are dispatched, therefore, only if a car call for the low zone or a down landing call for the low zone is registered to drop relay DFU by opening either the CB contact of the load car at 183 or contact SS at 182. Relay SS is deenergized only if a down landing call is registered in the low zone since the by contact H13 at 87.

A dispatch signal also resets the up dispatch timer low zone landing call contacts are connected to lead GN dropping out relays J1, J2 and J3. The dispatched car is given a starting signal, closes its doors, and starts upward. As it runs upward the car operates BUR to again reset the up dispatch timer. At the end of its up trip it is reversed automatically and returns to the lower dispatching landing where it again awaits dispatch.

Load dispatching of the low zone up load car can be accomplished on the saturated up peak program by closing its LW contact at 150 and 151 to energize FLD and expedite the dispatch interval.

High zone dispatching functions in the same manner as low zone dispatching. Arrival of car C or D at the lower terminal energizes CA through MGX to enable upper zone lower rotary car selector RSUE. If no upper zone car has its CUN energized, RUE completes the circuit for RSUE and a car is selected by energizing its CUN relay. If no car is in the up load status, DFUTE is deenergized and CUN causes the car to enter up load status by energizing its CUL relay. When upper zone up dispatch timer energizes relay J3E to energize the latch coil of upper zone up scheduling relay KUE, the CUD relay for the car is energized. KUE is reset by the immediate drop of DFULE and the delayed drop of DFUTE and another car, if available in up next status is advanced to up load status.

Full load dispatching of upper zone cars is accomplished through FLDE when a load car has its load weighing relay energized to close contact LW at 153 or 154.

Dispatch timing is detented for upper zone dispatching by DFUE and DFUAE. If no call is registered which can be answered by the upper zone load car when J2E is energized the timer is detented. DFUE effects release of the detent through open car call above contact CB(D) or CB(C) at 183 for a load car or open landing call contact SSA at 184. Relay SSA at 83 is deenergized to indicate a landing call which can be served by an upper zone car, any up landing call or a down landing call in the upper zone. Through the closure of contact H1 at 84 the effect of relay SS on SSA is cut out. In the third embodiment illustrated principally in FIGS. XIV, XV and XVI the top terminal dispatching equipment is altered on the saturated up peak program to control the up dispatching of one of the split banks. The upper zone bank in the example is so controlled. This is accomplished for the upper zone cars by arranging the saturated up peak program relay H1 to render upper dispatch terminal relays MG1 and MG1X responsive only to a car at the lower dispatch terminal by contact H1 at 258, down run relay BUR responsive only to cars ascending from the lower terminal by contacts H1 at 254 and 255, while the lower terminal relays MG and MGX are rendered inoperative by contact H1 at 257 and up run relay BUR is disabled by contact H1 at 256. With such changes the down scheduling relay KD provides the up scheduling functions for the upper bank and the down dispatch timer (not shown) and its adjuncts provide up dispatching functions. For example, down dispatch timer holding relays DFDA and DFD detent up dispatch intervals and release the up dispatch timer in response to car calls above the upper zone cars opening contact CB(C) or CB(D) at 261 or a landing call opening SSA at 260.

The indicators for up dispatching of the upper zone cars are shifted to control by the down dispatcher on this program and the down dispatching indicators are disconnected by contacts H1 and 271, 273, 276, 277, 278 and 279.

Selection and dispatching of upper zone cars at the lower terminal by the down dispatching equipment on the saturated up peak program is instituted upon the arrival of a car at the lower dispatch terminal by energizing upper dispatch terminal relays MG1 and MGX to enable upper rotary car selection relay RSD. If no other car has its down next lantern control relay CDN energized, upper selection control relay RD is deenergized to energize RSD. RSD successively closes its contacts in the circuits for the CDN relays of the several cars until it encounters a car at the lower terminal with its down load relay deenergized. The CDN relay of that car is energized to energize RD and stop the hunting of RSD. CDN closes its contact at 295, 297, 299 or 301 to enable the down load relay and energizes the "This Car Next" indicator for the upper zone car. When the down load control timer DFDT is timed out, indicating that a car has been released from the down load status for an interval, that down scheduling relay KD has been reset and that down dispatch timer has been reset, CDN advances the car into up load status by energizing down load relay CDL. Relay CDL enables down dispatch relay CDD for the upper zone car and the "up load" indicator for that car while releasing the down next lantern control CDN to permit another car to pull in its CDN and enter the up next status. Down dispatch timer (not shown) energizes its dispatch interval relay to latch down scheduling relay KD at the end of a dispatching interval and thereby energize the down dispatch relay CDD for the up load car to dispatch it upward. The car then closes its doors and begins its ascent operating down run relay BDR to reset down scheduling relay KD and the down dispatch timer in the manner described for resetting the up scheduling relay and up dispatch timer. A dispatching interval thereafter another car is dispatched upward by the down dispatcher if the saturated up peak program prevails, if an up zone car is available at the lower dispatching terminal and if a call is registered which that car is capable of serving.

It is to be understood that the several embodiments disclosed herein can be combined in various ways. Either the first or second control for setting up the saturated up peak operation can be combined with the embodiment utilizing the down dispatching equipment for up dispatching of one split bank of cars. The cars can be split into three or more banks serving different zones of landings. Other functions can be employed to establish the saturated up peak program such as the time of day, the number or rate of car or landing call registrations, the weight in the cars at given positions such as the lower terminal, or the distribution of the cars. These factors can be employed singly or in combination. From the above it is evident that the concepts embraced herein lend themselves to many variations and embellishments without departing from the spirit or scope of the invention. Accordingly, it is to be understood that the description is to be read as illustrative of the invention and not in a limiting sense.

Having described the invention, we claim:

1. An elevator system comprising a plurality of cars operating as a bank to serve a plurality of landings, one of said landings being a lower dispatching terminal, means for dispatching said cars from said lower dispatching terminal at intervals, means for monitoring the up service conditions in the system, means responsive to greater than a predetermined level of up service conditions for altering the operating mode of the system, means operative during said altered mode for dividing the bank of cars into a first and a second secondary bank of cars, the cars of said first secondary bank providing different service than those of said second secondary bank.

2. An elevator system comprising a plurality of cars operating as a bank to serve a plurality of landings, one of said landings being a lower dispatching terminal, means for dispatching said cars from said lower dispatching terminal at intervals, means for monitoring the up service conditions in the system, means responsive to greater than a predetermined level of up service conditions for altering the operating mode of the system, means operative during said altered mode for dividing the bank of cars into a first and second secondary bank of cars, and means operative during said mode for restricting service by cars of one secondary bank to less than all of the landings served by those cars during other operating modes.

3. An elevator system comprising a plurality of cars operating as a bank to serve a plurality of landings, one of said landings being a lower dispatching terminal, means for dispatching said cars from said lower dispatching terminal at intervals, means for monitoring the up service conditions of the system, means responsive to greater than a predetermined level of up service conditions for altering the operating mode of the system, means operative during said altered mode for dividing the bank of cars into a first and second secondary bank of cars, and means operative during said altered operating mode for restricting service by cars of one secondary bank to a low zone of landings.

4. An elevator system comprising a plurality of cars operating as a bank to serve a plurality of landings, one of said landings being a lower dispatching terminal, means for dispatching said cars from said lower dispatching terminal at intervals, means for monitoring the up service conditions in the system, means responsive to greater than a predetermined level of up service conditions for altering the operating mode of the system, means operative during said altered mode for dividing the bank of cars into a first and a second secondary bank of cars, means operative during said altered operating mode for restricting service by cars of the first secondary bank to a low zone of landings, and means operative during said altered operating mode for providing service to a high zone of landings.

5. An elevator system comprising a plurality of cars operating as a bank to serve a plurality of landings, one of said landings being a lower dispatching terminal, means for dispatching said cars from said lower dispatching terminal at intervals, means for monitoring the up service conditions in the system, up and down landing call registering means, car call registering means, means responsive to greater than a predetermined level of up service conditions for altering the operating mode of the system, means operative during said altered mode for dividing the bank of cars into a first and second secondary bank of cars, means operative during said altered mode for limiting response by cars of said first bank to down landing calls and car calls in a low zone of landings, and means operative during said altered mode for limiting service by cars of said second bank to down landing calls and car calls in an upper zone of landings spaced from said lower dispatching terminal by landings in said lower zone and to up landing calls.

6. An elevator system comprising a plurality of cars operating as a single bank and serving a plurality of landings including a lower dispatching landing, means for sensing up service conditions in said system, means responsive to greater than a predetermined level of up service for dividing said bank of cars into two secondary banks of cars each served by a plurality of said cars, and dispatching means for each secondary bank of cars for starting successive cars in the respective secondary bank from said lower dispatching terminal independently of the starting of the cars in the other secondary bank.

7. A system in accordance with claim 6 including means for limiting the service of a car in one of said banks to less than all of said plurality of landings.

8. An elevator system comprising a plurality of cars operating as a single bank of cars to serve a plurality of landings including a lower dispatching landing, means for monitoring the up service conditions in the system, means for grouping the landings into an upper and a lower zone each comprising a plurality of landings, and means responsive to greater than a predetermined level of up service for actuating said zoning means.

9. A system in accordance with claim 8 including means for registering up landing calls, means for registering down landing calls, means individual to each car for registering calls from within the car, and means for limiting service by cars serving the lower zone to car calls in the lower zone of landings and to down landing calls in the lower zone of landings.

10. A system in accordance with claim 8 including means for registering up landing calls at each of a plurality of landings, means for registering down landing calls at each of a plurality of said landings, means for registering car calls individual to the cars from within the cars for each of a plurality of said landings, and means responsive to greater than a predetermined up service condition for barring response by cars assigned to serve said upper zone to down landing calls and car calls in said lower zone.

11. An elevator system comprising a plurality of cars operating as a bank to serve a plurality of landings, means for dividing the bank of cars into two secondary banks, means to restrict the service provided by the cars in one of said secondary banks, a selecting mechanism for each bank for selecting a car at the lower dispatching terminal for dispatching therefrom, a dispatching mechanism for each bank, means for registering calls for service common to a plurality of cars, means for registering calls for service individual to each of the cars, and means to enable a dispatch signal to be issued by a dispatcher only as a call is registered which the selected car subject to said dispatcher is capable of serving.

12. An elevator system comprising a plurality of cars operating as a bank of cars to serve a plurality of landings including a lower dispatching terminal, means to split the bank of cars into a pair of secondary banks of cars, means to divide the landings into an upper zone of landings and a lower zone of landings, means to register up landing calls at each of a plurality of landings, means to register down landing calls at each of a plurality of landings, means to register calls within each car for each of a plurality of the landings, a dispatcher for each bank of cars for issuing dispatch signals to cars at the lower dispatching terminal, one of said banks of cars being arranged to provide service principally in said lower zone of landings, and means to enable the dispatcher for the bank of cars serving the lower zone of landings to issue a dispatch signal only if a down landing call or a car call is registered for a landing in the lower zone.

13. An elevator system comprising a plurality of cars operating as a bank of cars to serve a plurality of landings including a lower dispatching terminal, means to split the bank of cars into a pair of secondary banks of cars, means to divide the landings into an upper zone of landings and a lower zone of landings, means to register up landing calls at each of a plurality of landings, means to register down landing calls at each of a plurality of landings, means to register calls within each car for each of a plurality of the landings, a dispatcher for each bank of cars for issuing dispatch signals to cars at the lower dispatching terminal, one of said banks of cars being arranged to provide service principally in the upper zone of landings and means to enable the dispatcher for the bank of cars serving said upper zone of landings to issue a dispatch signal only as an up landing call, a down landing call in the upper zone of landings or a car call in the upper zone of landings is registered.

14. An elevator system comprising a plurality of cars operating in a group serving a plurality of floors, said floors including a lower group and an upper group, means to stop cars at a dispatching floor, a dispatcher for issuing starting signals to cars at said dispatching floor, means sensing a predetermined traffic condition indicative of a preponderance of traffic traveling from said terminal, means for dividing said cars into a first group serving said upper group of landings and means responsive to said sensing means for actuating said dividing means.

15. An elevator system comprising a plurality of cars operating as a bank serving a plurality of landings, means for operating said system in an up peak mode to provide a predominance of service in the up direction, means responsive to a first given level of up service in the system for actuating said up peak operating means, means for operating said system in a saturated up peak mode to provide intense up service for certain landings and restrict service to certain other landings in given cars and means responsive to a second given level of up service in the system which is greater than said first given level for actuating said saturated up peak operating means.

16. An elevator system comprising a plurality of cars operating as a bank serving a plurality of landings, means for operating said system in an up peak mode to provide a predominance of service in the up direction, means responsive to a first given level of up service in the system for actuating said up peak operating means, means for operating said system in a saturated up peak mode to provide intense up service for certain landings and restrict service to certain other landings in given cars, means responsive to a second given level of up service in the system which is greater than said first given level for actuating said saturated up peak operating means and means for maintaining said saturated up peak operating mode for a given interval following termination of the response of said second level responsive means.

17. An elevator system comprising a plurality of cars operating as a bank serving a plurality of landings, means for operating said system in an up peak mode to provide a predominance of service in the up direction, means responsive to a first given level of up service in the system for actuating said up peak operating means, means for operating said system in a saturated up peak mode to provide intense up service for certain landings and restrict service to certain other landings in given cars, means for actuating said saturated up peak operating mode and means operative at a certain time of day for maintaining said saturated up peak operating mode during a given period of time.

18. An elevator system comprising a plurality of cars operating as a bank serving a plurality of landings, means for operating said system in an up peak mode to provide a predominance of service in the up direction, means responsive to a first given level of up service in the system for actuating said up peak operating means, means for operating said system in a saturated up peak mode to provide intense up service for certain landings and restrict service to certain other landings in given cars, means for actuating said saturated up peak operating mode and means for maintaining said saturated up peak operating mode until termination of response of said means responsive to said first level.

19. An elevator system comprising a plurality of cars operating as a bank serving a plurality of landings, means for operating said system in an up peak mode to provide a predominance of service in the up direction, means responsive to greater than a given level of up service in the system for actuating said up peak operating means, means for operating said system in a saturated up peak mode to provide intense up service for certain landings and restrict service to certain other landings in given cars and means responsive to said given level of up service in the system and operative during a given period of time for instituting said saturated up peak operating mode.

20. An elevator system comprising a plurality of cars operating as a bank serving a plurality of landings, means for operating said system in an up peak mode to provide a predominance of service in the up direction, means responsive to greater than a first given level of up service in the system for actuating said up peak operating means, means for operating said system in a saturated up peak mode to provide intense up service for certain landings and restrict service to certain other landings in given cars, means for actuating said saturated up peak operating mode, and means responsive to said given level of up service during a given period of time for maintaining said saturated up peak operating mode.

21. An elevator system comprising a plurality of cars operating as a bank serving a plurality of landings, means monitoring the up service conditions in a first group of landings, means monitoring the up service conditions in a second group of landings, means for operating said system in an up peak mode to provide a predominance of service in the up direction, means for operating said system in a saturated up peak mode to augment the up service of said up peak mode by assigning cars to provide up service to certain landings and restrict service to certain other landings, means for actuating said saturated up peak operating mode, and means for maintaining said saturated up peak operating mode in response to a given level of up service conditions in one of said group of landings.

22. An elevator system comprising a plurality of cars operating as a bank serving a plurality of landings, means monitoring the up service conditions in a first group of landings, means monitoring the up service conditions in a second group of landings, means for operating said system in an up peak mode to provide a predominance of service in the up direction, means for operating said system in a saturated up peak mode to augment the up service of said up peak mode by assigning cars to provide up service to certain landings and restrict service to certain other landings, a first means for each group of landings responsive to greater than a first level of up peak service conditions, a second means for each group of landings responsive to a second level of up peak service conditions greater than said first level, and means to institute said saturated up peak mode in response to operation of a first service responsive means of one group of landings in coincidence with operation of a second service responsive means of said other group of landings.

23. An elevator system comprising a plurality of cars operating as a bank and serving a plurality of landings including a lower dispatching landing, means responsive to greater than a predetermined level of up service conditions for instituting an up operating program, means operative during said up operating program for dividing the landings into a lower zone and an upper zone, means operative during said up operating program for dividing the cars into two secondary banks, one serving the lower zone of landings and the other serving the upper zone of landings, and means operative during said up operating program for dispatching cars in each secondary bank from said lower dispatching landing independently of said other secondary bank.

24. An elevator system comprising a plurality of cars operating as a bank and serving a plurality of landings including a lower dispatching landing, means responsive to greater than a predetermined level of up service conditions for instituting an up operating program, means operative during said up operating program for dividing the landings into a lower zone and an upper zone, means operative during said up operating program for dividing the cars into two secondary banks, one serving the lower zone of landings and the other serving the upper zone of landings, means for each secondary bank to select a car for dispatching from said lower terminal, a dispatch timer operative during said up operating program for each secondary bank, and means for each secondary bank responsive to said dispatch timer for starting a selected car from said lower dispatch landing.

25. An elevator system comprising a plurality of cars operating as a bank and serving a plurality of landings including a lower dispatching landing, means responsive to greater than a predetermined level of up service conditions for instituting an up operating program, means operative during said up operating program for dividing the landings into a lower zone and an upper zone, means operative during said up operating program for dividing the cars into two secondary banks, one serving the lower zone of landings and the other serving the upper zone of landings, and means operative during said up operating program for indicating at the lower dispatching landing the cars serving each zone when said cars are divided.

26. An elevator system comprising a plurality of cars operating as a bank and serving a plurality of landings including a lower dispatching landing, lower dispatching means for dispatching the cars of said bank from said lower dispatching landing, means responsive to greater than a predetermined level of up service conditions for instituting an up operating program, means operative during said up operating program for dividing the landings into a lower zone and an upper zone, means operative during said up operating program for dividing the cars of said bank into two secondary banks, one serving said lower zone and the other said upper zone, means operative during said up operating program for dispatching cars of one of said secondary banks from said lower dispatching landing including said lower dispatching means for said bank, and means operative during said up operating program and independent of said lower dispatching means for said bank for dispatching cars of said other secondary bank from said lower dispatching landing.

27. An elevator system comprising a plurality of cars operating as a bank and serving a plurality of landings including a lower dispatching landing, a lower car selector for selecting cars at said lower dispatching landing for dispatching; a lower dispatch timer for measuring dispatching intervals; lower dispatching means for each car responsive to said dispatch timer when said car is selected for dispatching to institute operation of the car from the dispatching landing, means responsive to greater than a predetermined level of up service conditions for instituting an up operating program, means operative during said up operating program for dividing the landings into a lower zone and an upper zone, means operative during said up operating program for dividing the cars of said bank into two secondary banks, one bank of cars serving said lower zone of landings and the other bank of cars serving said upper zone of landings, said lower car selector, said lower dispatch timer and said lower dispatching means for the cars of one secondary bank cooperating to dispatch cars from said lower dispatching landing at intervals of time when said bank is divided, a secondary car selector operative during said up operating program for selecting cars of said other secondary bank at said lower dispatching landing; and a secondary dispatch timer operative during said up operating program for measuring dispatching intervals at said lower dispatching landing, said secondary car selector, said secondary dispatch timer and said dispatching means for the cars of the other secondary bank cooperating to dispatch cars from said lower dispatching landing at intervals of time when said bank is divided.

28. An elevator system comprising a plurality of cars operating as a bank and serving a plurality of landings including a lower dispatching landing, a lower car selector for selecting cars at said lower dispatching landing for dispatching; a lower dispatch timer for measuring dispatching intervals, lower dispatching means for each car responsive to said dispatch timer when said car is selected for dispatching to institute operation of the car from the dispatching landing, means responsive to greater than a predetermined level of up service conditions for instituting an up operating program, means operative during said up operating program for dividing the landings into a lower zone and an upper zone, means operative during said up operating program for dividing the cars of said bank into two secondary banks, one bank of cars serving said lower zone of landings and the other bank of cars serving said upper zone of landings, said lower car selector, said lower dispatch timer and said lower dispatching means for the cars of one secondary bank cooperating to dispatch cars from said lower dispatching landing at intervals of time when said bank is divided; a secondary car selector operative during said up operating program for selecting cars of said other secondary bank at said lower dispatching landing, a secondary dispatch timer operative during said up operating program for measuring dispatching intervals at said lower dispatching landing, and a secondary dispatching means operative during said up operating program for each of the cars of said other secondary bank, said secondary car selector, said secondary dispatch timer and said secondary dispatching means for the cars of the other secondary bank cooperating to dispatch cars from said lower dispatching landing at intervals of time when said bank is divided.

29. An elevator system comprising a plurality of cars operating as a bank and serving a plurality of landings including an upper and a lower dispatching landing, dispatching means for said upper landing for starting cars downward from that landing, dispatching means for said lower landing for starting cars upward from that landing, means for sensing the up service conditions in the system, zoning means for dividing said landings into an upper and lower zone in response to greater than a predetermined up service condition, means for dividing the bank of cars into secondary banks, a first secondary bank serving one zone and a second secondary bank serving the other zone, said dispatching means for said lower landing controlling the starting of the cars of said first secondary bank upward from said lower dispatching landing, and means transferring control of said upper dispatching means to the starting of the cars of said second secondary bank upward from said lower dispatching landing.

30. An elevator system according to claim 29 wherein said means for dividing the bank of cars into secondary banks is operative in response to greater than a predetermined level of the up service conditions.

31. An elevator system according to claim 29 wherein said means for transferring control of said upper dispatching means is operative in response to greater than a predetermined level of the up service conditions.

32. An elevator system comprising a plurality of cars operating as a bank and serving an upper terminal landing and a plurality of landings below the upper terminal, means for registering calls individual to the cars, means for sensing the service conditions in the system, means to divide the landings into an upper zone comprising said upper terminal and a plurality of landings below and a lower zone comprising a plurality of landings below the upper zone in response to greater than a predetermined service condition, means to assign selected cars to serve one zone and limit service to the other, and means to enable said assigning means for a car only when no calls are registered individual to the car.

33. An elevator system comprising a plurality of cars operating as a bank to serve a plurality of landings, means for monitoring the traffic conditions in the elevator system, means for operating the system in a first mode, means for operating the system in a second mode, means for altering the operation of the system from said first mode to said second mode in response to a first predetermined traffic condition, and means for altering the operation of the system from said first mode to said second mode in response to a second predetermined traffic condition different from said first condition during a given interval of time.

34. A system as defined in claim 33 wherein said interval of time occurs at a given time of day.

35. An elevator system comprising a car operating to serve a plurality of landings, means for monitoring the traffic conditions in the elevator system, means for operating the system in a first mode, means for operating the system in a second mode, means for altering the operation of the system from said first mode to said second mode in response to a first predetermined traffic condition, and means for altering the operation of the system from said first mode to said second mode in response to a second predetermined traffic condition different from said first condition during a given interval of time.

36. An elevator system comprising a plurality of cars operating as a group to serve a plurality of landings including a dispatching landing, nonrotational means to assign a car for loading at the dispatching landing, means to indicate the assigned car to passengers at the dispatching landing, means to condition a car as next to be assigned for loading at the dispatching landing, and means to indicate the conditioned car to passengers at the dispatching landing.

37. An elevator system according to claim 36 wherein the means to indicate the conditioned car is an illuminated sign.

38. An elevator system according to claim 36 wherein the means to indicate the conditioned car is located at the landing adjacent the entry to each elevator car.

39. An elevator system comprising a plurality of cars operating as a group to serve a plurality of landings including a dispatching landing, means to divide the group of cars into a first and secondary group, the cars of said first secondary group providing different service than those of said second secondary group, nonrotational means to assign a car in each secondary group for loading at the dispatching landing, means to indicate the assigned car to passengers at the dispatching landing, means to condition a car in each secondary group as next to be assigned for loading at the dispatching landing, and means to indicate the conditioned car to passengers at the dispatching landing.

40. An elevator system comprising a plurality of cars operating as a group to serve a plurality of landings, means for dividing the group of cars into two secondary groups, means to restrict the service provided by the cars in one of said secondary groups, a selecting mechanism for each secondary group for selecting a car at the lower dispatching terminal for dispatching therefrom, a dispatching mechanism for each secondary group, means for registering calls for service common to a plurality of cars, means for registering calls for service individual to each of the cars, and means to render a car subject to control of a dispatcher responsive to a dispatch signal only when a call is registered which the car is capable of serving.

41. An elevator system comprising a plurality of cars operating as a group and serving a plurality of landings including a lower dispatching landing, means responsive to greater than a predetermined level of up service conditions for instituting an up operating program, means operative during said up operating program for dividing the landings into a lower zone and an upper zone and means operative during said up operating program for dividing the group of cars into two secondary groups, one serving the lower zone of landings and the other serving the upper zone of landings.

42. An elevator system comprising a plurality of passenger-operated cars operating as a group and each serving at least a plurality of common floors including a lower dispatching floor, means for individually conditioning said cars for loading at said dispatching floor while operating in said group, means to issue spaced starting signals to conditioned cars at said dispatching floor while operating in said group, means to divide said group of cars into secondary groups each comprising a plurality of cars, at least one secondary group of cars serving a plurality of floors but less than all of said plurality of common floors, means for each secondary group for individually conditioning said cars of said respective secondary group for loading at said dispatching floor and means for each secondary group for issuing spaced starting signals to conditioned cars at said dispatching floor and operating in said group.

References Cited in the file of this patent
UNITED STATES PATENTS

| | | |
|---|---|---|
| 2,652,903 | Borden et al. | Sept. 22, 1953 |
| 2,722,672 | Suozzo | Nov. 1, 1955 |

UNITED STATES PATENT OFFICE
CERTIFICATE OF CORRECTION

Patent No. 3,080,944                                March 12, 1963

Raymond A. Burgy et al.

It is hereby certified that error appears in the above numbered patent requiring correction and that the said Letters Patent should read as corrected below.

Column 6, line 45, for "IV" read -- VI --; column 8, TABLE D, second column, line 7 thereof, for "Lead" read -- Load --; column 10, line 26, for "conact" read -- contact --; column 40, line 75, strike out "low zone landing call contacts are connected to lead GN" and insert the same before "by" in line 73, same column 40; column 41, line 66, for "and", first occurrence, read -- at --; column 43, line 8, for "of" read -- in --; column 47, line 71, strike out "the".

Signed and sealed this 9th day of June 1964.

(SEAL)
Attest:

ERNEST W. SWIDER                                    EDWARD J. BRENNER
Attesting Officer                                      Commissioner of Patents